(12) United States Patent  
Kajino et al.

(10) Patent No.: US 7,855,825 B2  
(45) Date of Patent: Dec. 21, 2010

(54) MICROMACHINE STRUCTURE SYSTEM AND METHOD FOR MANUFACTURING SAME

(75) Inventors: Osamu Kajino, Osaka (JP); Hironori Tomita, Nara (JP); Yoshihiro Mushika, Osaka (JP)

(73) Assignee: Panasonic Corporation, Osaka (JP)

( * ) Notice: Subject to any disclaimer, the term of this patent is extended or adjusted under 35 U.S.C. 154(b) by 553 days.

(21) Appl. No.: 11/911,223

(22) PCT Filed: Apr. 14, 2006

(86) PCT No.: PCT/JP2006/307922

§ 371 (c)(1), (2), (4) Date: Oct. 11, 2007

(87) PCT Pub. No.: WO2006/112387

PCT Pub. Date: Oct. 26, 2006

(65) Prior Publication Data

US 2009/0067033 A1  Mar. 12, 2009

(30) Foreign Application Priority Data

Apr. 15, 2005  (JP) .............................. 2005-117894

(51) Int. Cl.
*G02B 26/00*  (2006.01)
(52) U.S. Cl. ................ 359/291; 359/292; 359/295; 359/298; 359/318; 345/108; 348/771
(58) Field of Classification Search .................. 359/223, 359/224, 290–292, 295, 298, 318; 345/85, 345/108; 348/770, 771
See application file for complete search history.

(56) References Cited

U.S. PATENT DOCUMENTS

| 6,618,186 | B2 | 9/2003 | Kaeriyama |
| 2003/0174934 | A1* | 9/2003 | Ishii et al. ..................... 385/18 |
| 2004/0061917 | A1 | 4/2004 | Mushika et al. |

FOREIGN PATENT DOCUMENTS

| JP | 2002-189178 | 7/2002 |
| JP | 2002-267996 | 9/2002 |
| JP | 2002-321198 | 11/2002 |
| JP | 2004-330363 | 11/2004 |
| WO | 02/061488 | 8/2002 |

OTHER PUBLICATIONS

International Search Report for corresponding Application No. PCT/JP2006/307922 dated Jul. 18, 006, (2006).
PCT/ISA/237 and concise explanation, (2006).

* cited by examiner

*Primary Examiner*—Evelyn A. Lester
(74) *Attorney, Agent, or Firm*—Renner, Otto, Boisselle & Sklar, LLP

(57) ABSTRACT

A micro-mechanical structure system according to the present invention includes: a movable structure 5, at least a portion of the movable structure 5 being formed of a single-crystalline material; an elastic supporting member 10 for supporting the movable structure 5; a stationary electrode section 13, 25 at least partially opposing the movable structure 5; and a base 22 which has a circuit section and to which the stationary electrode 13, 25 is affixed. The stationary electrode section 13, 25 includes a first electrode layer (upper stationary electrode layer) 13 positioned relative to the movable structure 5 and a second electrode layer (lower stationary electrode layer) 25 positioned relative to the base 22, the first electrode layer 13 and the second electrode layer 25 being bonded to each other via adhesion layers 15 and 16.

15 Claims, 24 Drawing Sheets

(a)

(b)

(a)

(b)

(a)

(b)

(a)

(b)

(a)

(b)

(a)

(b)

(c)

(a)

(b)

MICROMACHINE STRUCTURE SYSTEM AND METHOD FOR MANUFACTURING SAME

TECHNICAL FIELD

The present invention relates to a micro-mechanical structure system for driving a minute movable section which is supported by an elastic supporting member, and relates in particular to: a micro-mechanical structure system which is suitable for a micromirror whose movable section has a light reflecting surface, and a micromirror device including a two-dimensional array of such micromirrors so as to be capable of independent driving; and a production method thereof.

BACKGROUND ART

In recent years, very small micromirror devices utilizing MEMS (Micro Electro Mechanical System) technology have been proposed, with a view to controlling the wavefront of light in the field of adaptive optics, and realizing a mechanical optical switch for reflecting a light beam in such a manner as to enter a photoelectric element or an optical fiber which is at a predetermined position.

In a micromirror device, it is necessary to enhance the planarity of the mirror surface in order to enhance the quality of reflected light. In order to realize this, use of a single-crystalline silicon layer of an SOI (Silicon on Insulator) substrate as a mirror surface has been proposed. A single-crystalline silicon layer which an SOI substrate possesses is characterized by absence of residual stress and excellent planarity, and allows a highly planar mirror to be formed. Moreover, vertical trenches can be formed in a single-crystalline silicon layer by DRIE (DEEP REACTIVE ION ETCHING) technique, and this can be utilized to form a mirror.

However, inside a single-crystalline silicon layer, it is difficult to form trenches which are parallel to the single-crystalline silicon layer, and it is impossible by merely processing the single-crystalline silicon layer to realize a hollow shape for allowing a driving electrode and a mirror to oppose each other. Therefore, in a micromirror device which requires the construction in which a driving electrode and a mirror oppose each other, a method is adopted which involves separately providing a substrate which has only a driving electrode formed thereon, and performing a bonding to integrate the mirror substrate and the electrode substrate (see, for example, Patent Document 1).

FIG. 24 is a cross-sectional view showing the construction of a conventional mirror array described in Patent Document 1 in a phase during its production steps.

At the phase shown in FIG. 24, a mirror substrate 100 and an electrode substrate 120, which have been separately produced, are interposed in a stacked state between a stage 901 and a die bonder 701. Specifically, the mirror substrate 100 is affixed upside down to the stage 901, whereas the electrode substrate 120 is affixed onto a die bonder 701.

The mirror substrate 100 is formed by patterning the SOI substrate 101 by photography technique and etching technique, and includes mirrors 105. The mirrors 105 are elastically supported by a frame portion (not shown), and the surrounding insulating layer and handle substrate are removed so as to permit free pivoting.

On the other hand, on the electrode substrate 120, control electrodes 124 are formed in positions opposing the mirrors 105. Supporting members 125 are formed on the electrode substrate 120, with a spacer pattern 801 being formed on the supporting members 125. The spacer pattern 801 is formed by, after separately forming an electrically conductive paste pattern (not shown) on a transfer plate (not shown), pressing it onto the supporting members 125 to effect a transfer. At this time, if the electrically conductive paste pattern is too thick, the spacer pattern 801 may be crushed and deformed, thus protruding. Therefore, the electrically conductive paste pattern is to be formed while its thickness is precisely controlled.

In order to form the multilayer structure shown in FIG. 24, the stage 901 carrying the mirror substrate 100 and the die bonder 701 carrying the electrode substrate 120 are allowed to make relative movements so that the spacer pattern 801 on the electrode substrate 120 abuts with a frame portion (not shown) of the mirror substrate 100. By performing a bake in this state, the mirror substrate 100 side and the electrode substrate 120 side are allowed to adhere to each other, whereby the mirrors 105 and the control electrodes 124 become fixed at a certain distance.

The control electrodes 124 are constructed so as to be capable of independent feeding via a wiring layer 123. For example, by setting the mirrors 105 at a ground potential, and applying drive potentials to the control electrodes 124, electrostatic forces can be created between the mirrors 105 and the control electrodes 124, thus causing the mirrors 105 to pivot.

[Patent Document 1] Japanese Laid-Open Patent Publication No. 2004-330363 (p. 9, FIG. 9)

DISCLOSURE OF INVENTION

Problems to be Solved by the Invention

In accordance with the aforementioned conventional technique, due to limitations of alignment precision when carrying out an alignment by driving the stage 901 and the die bonder 120, large bonding position errors may occur between the mirrors 105 and the control electrodes 124, along a direction which is parallel to the mirror substrate 100. When such position errors occur, the points of application of the electrostatic forces acting on the mirrors 105 may become deviated, thus causing changes in rotation moments and introducing large errors in pivoting operations of the mirrors. Generally, high precision cannot be expected for the alignment between the stage 901 and the die bonder 702 at bonding, and there is also an influence of deformation of the spacer pattern 801. This may lead to large alignment errors between the mirrors 105 and the control electrodes 124 in the direction which is parallel to the mirror substrate 100. Thus, the bonding technique presents a considerable problem in that the points of application of the electrostatic forces acting on the mirrors 105 may become deviated and cause changes in rotation moments.

Moreover, with the aforementioned conventional technique, it is also difficult to minimize variations in the relative distances between the mirrors 105 and the control electrodes 124 along a direction which is perpendicular to the mirror substrate 100. This results in another problem in that increased variations in the electrostatic forces generated between the mirrors 105 and the control electrodes 124 may introduce large errors in the controlling of mirrors.

A relative distance between a mirror 105 and a control electrode 124 is determined by the thickness of the spacer pattern 801. The thickness of the spacer pattern 801 may greatly change depending on the viscosity of the electrically conductive paste pattern and the pressurizing force, and it is difficult to always form a uniform thickness. There is also a problem in that, when effecting adhesion between the mirror substrate 100 and the electrode substrate 120, the spacer pattern 801 may deform to cause further variations in the relative distance. Since the electrostatic force between a mirror 105 and a control electrode 124 fluctuates in inverse proportion with a square of their relative distance, very large variations in the electrostatic force may introduce a large error in the controlling of the mirror.

The present invention has been made in view of the above problems, and an objective thereof is to provide: a micromechanical structure system which reduces variations in the relative distance between and relative positions of an electrode and a movable structure (mirror), such that the movable structure can be driven and controlled with a high precision; and a production method thereof.

Means for Solving the Problems

A micro-mechanical structure system according to the present invention comprises: a movable structure, at least a portion of the movable structure being formed of a single-crystalline material; an elastic supporting member for supporting the movable structure; a stationary electrode section at least partially opposing the movable structure; and a base having a circuit section and the stationary electrode section provided thereon, the stationary electrode section being electrically connected to the circuit section, wherein, the stationary electrode section includes a first electrode layer positioned relative to the movable structure and a second electrode layer positioned relative to the base, the first electrode layer and the second electrode layer being bonded to each other directly or via an electrically conductive substance.

In a preferred embodiment, a region defined by projecting the first electrode layer onto an upper face of the base is contained within a region defined by projecting the second electrode layer onto the upper face of the base.

In a preferred embodiment, the first electrode layer includes a portion overhanging beyond the second electrode layer along a lateral direction.

In a preferred embodiment, the first electrode layer includes a first stationary electrode and a second stationary electrode; and the first stationary electrode supports the elastic supporting member, and the second stationary electrode at least partially opposes the movable structure via a predetermined gap.

In a preferred embodiment, the first stationary electrode and the second stationary electrode are at least partially formed so as to be substantially coplanar.

In a preferred embodiment, the movable structure includes a light reflecting film on a face opposite from a face opposing the base.

In a preferred embodiment, the elastic supporting member is disposed between the movable structure and the base.

In a preferred embodiment, an intermediate electrode disposed between the movable structure and the second stationary electrode via a predetermined gap is further comprised, wherein, the intermediate electrode is linked to the movable structure, and composes a portion of the movable structure.

In a preferred embodiment, an intermediate electrode disposed between the movable structure and the second stationary electrode via a predetermined gap is further comprised, wherein, the intermediate electrode is linked to the second stationary electrode, and composes a portion of the second stationary electrode.

In a preferred embodiment, a misalignment of the first electrode layer with respect to the movable structure and a misalignment of the second electrode layer with respect to the base are each smaller than a misalignment between the first electrode layer and the second electrode layer.

A production method for a micro-mechanical structure system according to the present invention comprises: a step (A1) of providing a first substrate having a single-crystalline silicon layer and a handle substrate, and shaping the single-crystalline silicon layer into a movable structure; a step (A2) of forming a first sacrificial layer on the single-crystalline silicon layer; a step (A3) of forming an elastic support layer on the first sacrificial layer; a step (A4) of forming by deposition a second sacrificial layer on the elastic support layer; a step (A5) of forming on the second sacrificial layer a first electrode layer to function as part of a stationary electrode layer; a step (B) of providing a second substrate having a circuit and a second electrode layer, the second electrode layer being electrically connected to the circuit to function as part of a stationary electrode; a step (C) of disposing the first substrate and the second substrate so as to oppose each other, and bonding the first electrode layer to the second electrode layer; a step (D) of removing the handle substrate and exposing the movable structure; and a step (E) of removing the first sacrificial layer and the second sacrificial layer to allow the stationary electrode to at least partially oppose the movable structure.

In a preferred embodiment, after step (D), a step of forming a light reflecting film on a surface of the movable structure is comprised.

In a preferred embodiment, after step (A1), a step of forming a stress adjustment film is comprised.

An optical pickup according to the present invention is an optical pickup comprising: a light source for emitting a light beam; an objective lens for converging the light beam onto an optical disk; a photodetector for receiving the light beam reflected from the optical disk and generating an electrical signal; and an aberration correcting device for correcting an aberration of the light beam, wherein, the aberration correcting device includes: a movable structure, at least a portion of the movable structure being formed of a single-crystalline material; an elastic supporting member for supporting the movable structure; a stationary electrode section at least partially opposing the movable structure; and a base having a circuit section and the stationary electrode section provided thereon, the stationary electrode section being electrically connected to the circuit section, wherein, the stationary electrode section includes a first electrode layer positioned relative to the movable structure and a second electrode layer positioned relative to the base, the first electrode layer and the second electrode layer being bonded to each other directly or via an electrically conductive substance.

An optical disk apparatus according to the present invention is an optical disk apparatus comprising: a motor for rotating an optical disk; an optical pickup for accessing a desired track on the optical disk; and a signal processing section for reproducing data from the optical disk based on an output from the optical pickup, wherein, the optical pickup includes: a light source for emitting a light beam; an objective lens for converging the light beam onto an optical disk; a photodetector for receiving the light beam reflected from the optical disk and generating an electrical signal; and an aberration correcting device for correcting an aberration of the light beam, wherein, the aberration correcting device includes: a movable structure, at least a portion of the movable structure being formed of a single-crystalline material; an elastic supporting member for supporting the movable structure; a stationary electrode section at least partially opposing the movable structure; and a base having a circuit section and the stationary electrode section provided thereon, the stationary electrode section being electrically connected to the circuit section, wherein, the stationary electrode section includes a first electrode layer positioned relative to the movable structure and a second electrode layer positioned relative to the base, the first electrode layer and the second electrode layer being bonded to each other directly or via an electrically conductive substance.

A display device according to the present invention is a display device comprising: a light source for emitting a light beam; a light source driving section for modulating an intensity of the light beam in accordance with an image signal; and a scan mirror section for scanning a screen with the light beam, wherein, the scan mirror section includes: a movable structure, at least a portion of the movable structure being formed of a single-crystalline material; an elastic supporting member for supporting the movable structure; a stationary electrode section at least partially opposing the movable structure; and a base having a circuit section and the stationary electrode section provided thereon, the stationary electrode section being electrically connected to the circuit section, wherein, the stationary electrode section includes a first electrode layer positioned relative to the movable structure and a second electrode layer positioned relative to the base, the first electrode layer and the second electrode layer being bonded to each other directly or via an electrically conductive substance, wherein, at least a portion of the movable structure functions as a mirror for reflecting the light beam.

Another micro-mechanical structure system according to the present invention comprises: a movable structure, at least a portion of the movable structure being formed of a single-crystalline material; an elastic supporting member for supporting the movable structure; a stationary electrode section at least partially opposing the movable structure; and a base having a circuit section and the stationary electrode section provided thereon, the stationary electrode section being electrically connected to the circuit section, wherein, the stationary electrode section includes a multilayer structure including a first electrode layer and a second electrode layer which are bonded to each other directly or via an electrically conductive substance; and a misalignment of the first electrode layer with respect to the movable structure and a misalignment of the second electrode layer with respect to the base are each 10 μm or less.

Effects of the Invention

In accordance with a micro-mechanical structure system of the present invention and a production method thereof, a high alignment precision is not required when bonding a movable structure which is formed of a single-crystalline material to a circuit section. This improves the production yield, whereby a micro-mechanical structure system that can be produced at low cost can be provided. Since the variations in the relative distance between and relative positions of a movable structure and an electrode are reduced, a micro-mechanical structure system which allows a movable structure to be driven and controlled with a high precision can be provided.

Figure 1:
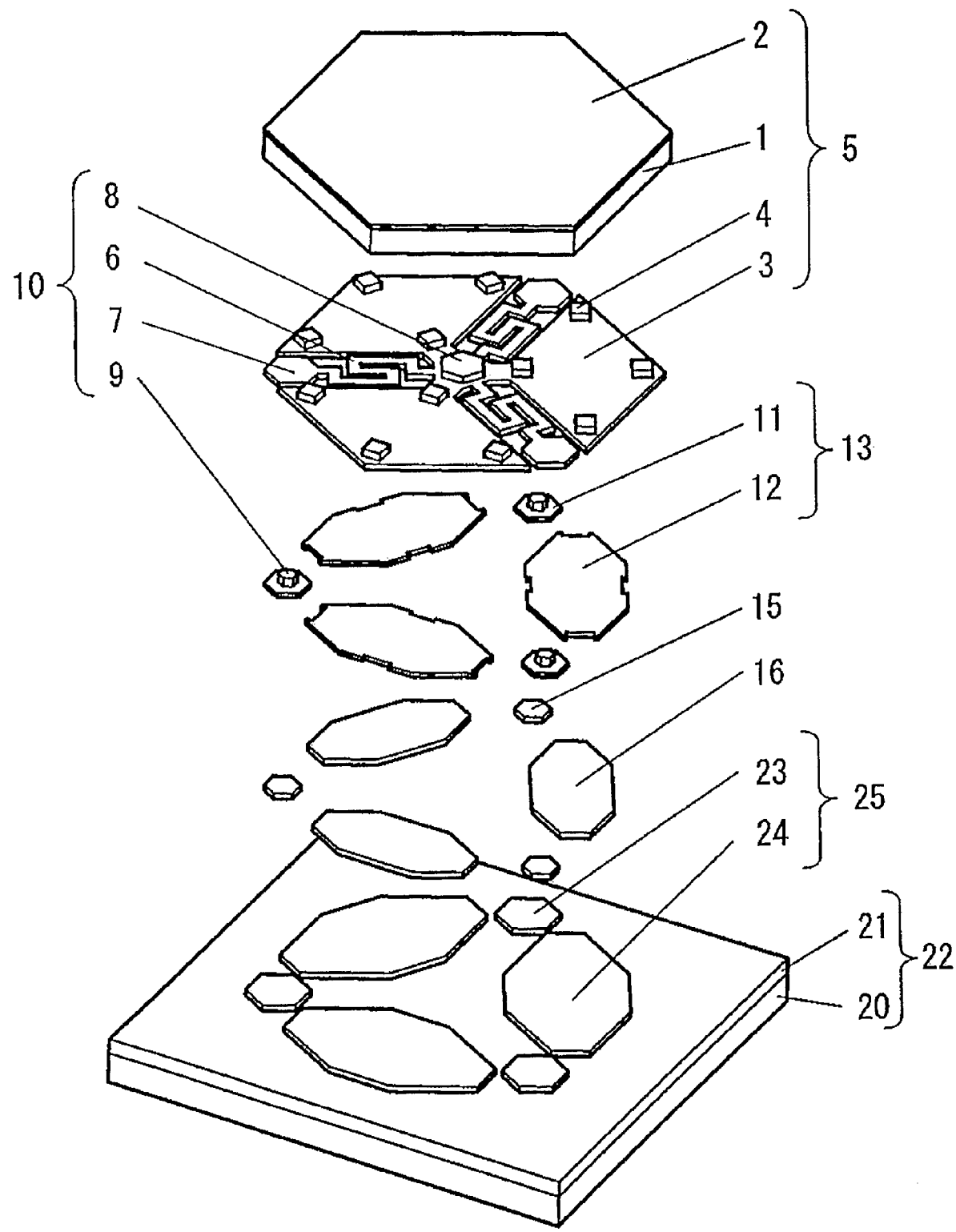
FIG. 1 An exploded perspective view of a micro-mechanical structure system according to the present embodiment.

DESCRIPTION OF THE REFERENCE NUMERALS 1 mirror
1a mirror surface
2 light reflecting film
3 intermediate electrode
4 first link portion
5 movable structure
6 hinge member
7 hinge outer peripheral end
8 mirror link post
9 hinge post
10 elastic supporting member
11 hinge electrode (first stationary electrode)
12 actuator electrode (second stationary electrode)
13 upper stationary electrode layer (first electrode layer)
15 first adhesion member
16 second adhesion member
20 circuit section
21 insulating layer
22 base
23 first circuit electrode
24 second circuit electrode
25 lower stationary electrode (second electrode layer)
30 SOI substrate (first substrate)
31 handle substrate
32 embedded insulating layer
33 single-crystalline silicon layer
34 trench
40 first sacrificial layer
41 via
42 via
43 via
45 hinge layer
50 second sacrificial layer
51 via
52 hole
55 stationary electrode layer
60 adhesion layer
61 mirror wafer
61a mirror wafer cutting site
62 CMOS wafer (second substrate)
70 intermediate electrode
71 electrode bonding portion
72 second link portion
73 via
74 stress adjustment film
80 via
84 hinge post
85 stopper
86 third sacrificial layer
86a intermediate stage
87 via
88 hinge groove
90 hinge member
91 hinge outer peripheral end
92 via

BEST MODE FOR CARRYING OUT THE INVENTION

Hereinafter, embodiments of the present invention will be described with reference to the drawings.

Embodiment 1

With reference to FIG. 1, a first embodiment of a mechanical structure system (micromirror device) according to the present invention will be described. FIG. 1 is an exploded perspective view of a micro-mechanical structure system (micromirror device) according to the present embodiment. Although one mirror is illustrated in FIG. 1, the micromirror device of the present embodiment includes a plurality of mirrors in a two-dimensional array.

The micro-mechanical structure system according to the present embodiment includes: a movable structure 5 at least a portion of which is formed of a single-crystalline material; an elastic supporting member 10 supporting the movable structure 5; a stationary electrode section 13, 25 at least partially opposing the movable structure 5; and a base 22 having a circuit section and having the stationary electrode section 13, 25 affixed thereto.

The present embodiment is characterized in that the stationary electrode section 13, 25 includes a first electrode layer (upper stationary electrode layer) 13 which is positioned relative to the movable structure 5 and a second electrode layer (lower stationary electrode layer) 25 positioned relative to the base 22, and that the first electrode layer 13 and the second electrode layer 25 are bonded via adhesion layers 15 and 16.

The movable structure 5 includes a mirror 1, a light reflecting film 2, intermediate electrodes 3, and first link portions 4, which are linked to one another so as to operate always integrally.

The mirror 1 is formed of a hexagonal piece of single-crystalline silicon each of whose side is about 50 μm (thickness: e.g. 5 to 10 μm). Since single-crystalline silicon is free of residual stress and is unlikely to be warped, the mirror 1 has a high planarity and excellent optical characteristics. The light reflecting film 2 is a thin metal film (e.g., Al or Ag) provided on the mirror 1, and provides an increased reflectance for light of a predetermined wavelength so as to suppress the loss of light amount. The light reflecting film 2 has a thickness of e.g. several dozen nm. The intermediate electrodes 3 are electrodes being formed of polysilicon and having a thickness of 0.3 μm to 1 μm. For each mirror 1, three intermediate electrodes 3 are provided so as to leave a predetermined interspace from the mirror 1. The intermediate electrodes 3 are linked to one another in the center. The mirror 1 and the intermediate electrodes 3 are rigidly coupled via first link portions 4, which are formed of polysilicon. Each intermediate electrode 3 has four first link portions provided thereon.

The elastic supporting member 10 includes hinge members 6, hinge outer peripheral ends 7, a mirror link post 8, and hinge posts 9. The hinge members 6 are elongated beams being formed of polysilicon and having a width of e.g. about 1 to 4 μm, which extend in the outer peripheral direction from near the central portion between the intermediate electrodes 3. The hinge members 6 have elasticity, and provide a restoration force for restoring the original position when the mirror 1 has been displaced. The hinge support portions 7 are hinge outer peripheral ends, provided at the outer peripheral ends of the hinge members 6. The mirror link post 8 is a post formed of polysilicon, which links the mirror 1 to the hinge members 6. The hinge posts 9 are posts formed of polysilicon, one end of each of which is coupled to a hinge outer peripheral end 7.

In the present embodiment, the upper stationary electrode layer 13 is composed of the hinge electrodes 11 and the actuator electrodes 12, whereas the lower stationary electrode 23 is composed of the first circuit electrodes 23 and the second circuit electrodes 24. Hereinafter, their construction will be described.

The hinge electrodes (first stationary electrodes) 11 are electrodes being formed of polysilicon and having a thickness of e.g. 1 µm, and serve also as bases for supporting the hinge outer peripheral ends 7 via the hinge posts 9. The actuator electrodes (second stationary electrodes) 12 are electrodes formed of polysilicon, being formed so as to be substantially coplanar with the hinge electrodes 11. Opposing the intermediate electrodes 3, three actuator electrodes 12 are provided to constitute three electrostatic actuators together with the intermediate electrodes 3.

When a voltage is applied to an actuator electrode 12, an electrostatic force is generated between itself and the opposing intermediate electrode 3, so that the intermediate electrode 3 can be displaced toward the actuator electrode 12 until an equilibrium with the elastic force of the elastic supporting member 10 is established. By independently setting voltages for the three actuator electrodes 12, it becomes possible to independently change the positions of the three intermediate electrodes 3. As a result, the mirror 1 can be translated or pivoted.

Generally speaking, the electrostatic force of an electrostatic actuator is in inverse proportion with a square of the distance between its electrodes. In the present embodiment, electrostatic actuators are composed not by the mirror 1 and the actuator electrodes 12, but by the intermediate electrodes 3 (which are provided between the mirror 1 and the actuator electrodes 12) and the actuator electrodes 12. Therefore, the distance between the electrodes is reduced, thus enabling low-voltage driving with large electrostatic forces.

The first adhesion members 15 are Au films having a thickness of 2 to 3 µm, and are provided on the rear faces of the hinge electrodes 11. The second adhesion members 16 are Au films which are provided on the rear faces of the actuator electrodes 12, being formed of films having the same material and same thickness as those of the first adhesion members 15.

A circuit section 20 is a group of circuits which generates control signals for independently controlling each mirror 1, and is typically an integrated circuit substrate called a CMOS substrate. An insulating layer 21 is an insulating film for protecting the circuit section 20. The circuit section 20 and the insulating layer 21 constitute the base 22.

The first circuit electrodes 23 are provided on the insulating layer 22, and are connected to the circuit section 20 through vias (not shown). The first circuit electrodes 23 output control signals to the hinge electrodes 11, which are generated in the circuit section 20. The second circuit electrodes 24 are provided on the insulating layer 22, and are connected to the circuit section 20 through vias (not shown). The second circuit electrodes 24 output control signals to the actuator electrodes 12, which are generated in the circuit section 20. Preferably, the first and second circuit electrodes 23 and 24 are both formed of Au. As described earlier, the first circuit electrodes 23 and the second circuit electrodes 24 constitute the lower stationary electrode layer 25.

Figure 2:
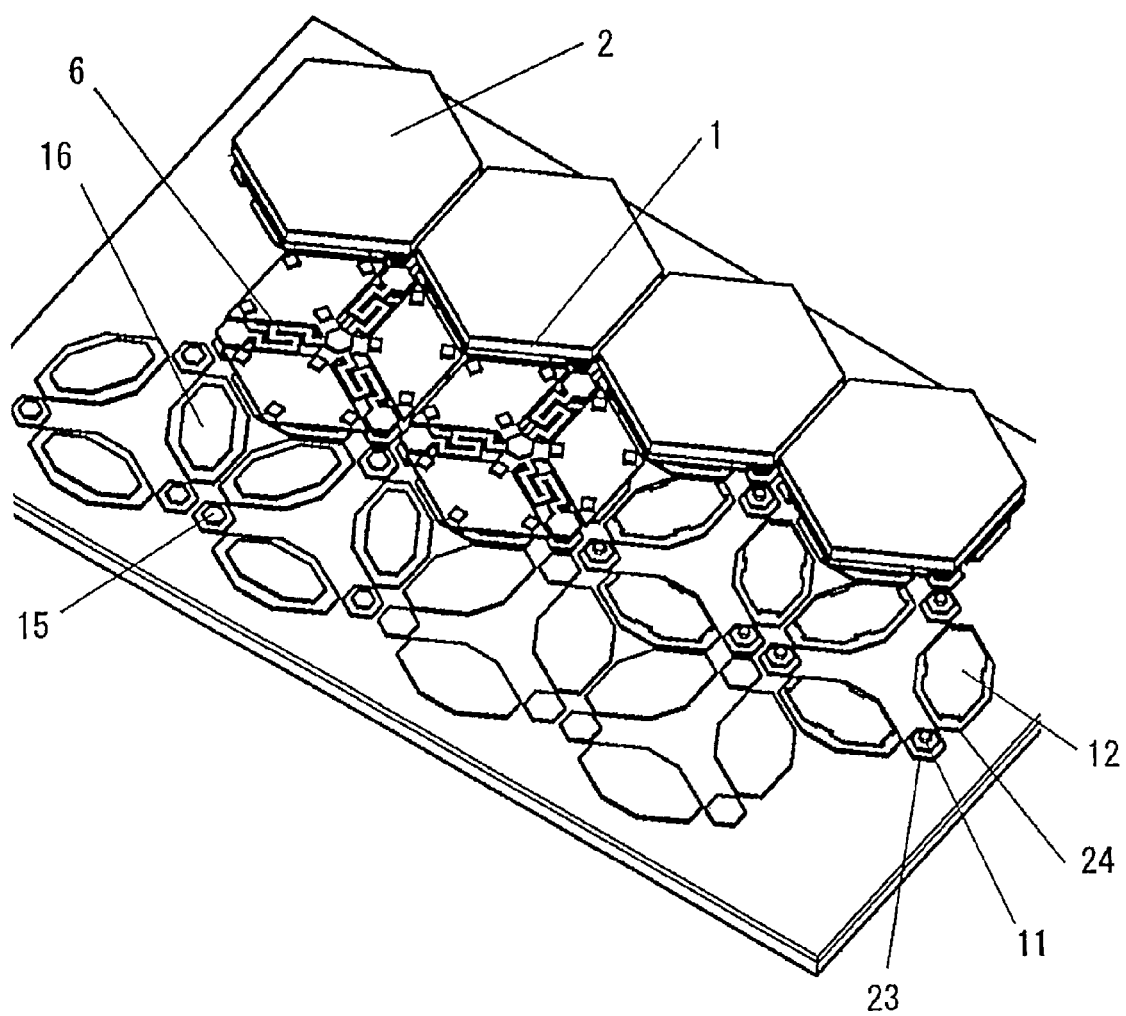
FIG. 2 An exploded perspective view of a micro-mechanical structure system according to the present embodiment in an arrayed state.

FIG. 2 is an exploded perspective view of a micro-mechanical structure system according to the present embodiment in an arrayed state. In order to show the internal structure, the structure is partially omitted, thus only partly showing the array.

In FIG. 2, the mirrors 1 which are regular hexagons are disposed at an interspace of 1 to 2 µm between adjoining ones of them. In a micro-mechanical structure system which is used for the purpose of controlling the wavefront of light in adaptive optics, about one thousand mirrors 1 may be provided on the same substrate, for example, and each is independently driven to control the phase of the reflection wavefront. The movable stroke of each mirror 1 is ±0.5 µm, for example.

In this example, the entirety of each elastic supporting member 10 including the hinge support portions 6 and the like is completely accommodated under each mirror 1, thus reducing the area that does not function as mirrors, whereby the loss of light amount is decreased.

The actuator electrodes 12 are bonded onto the second circuit electrodes 24 via the second adhesion members 16. Since each actuator electrode 12 has an outer shape which is smaller that that of each second circuit electrode 24, substantially the entire surface of the actuator electrode 12 is bonded to the second circuit electrode 24. The polysilicon composing each actuator electrode 12 inevitably has a stress gradient along the thickness direction, so that warpage may occur in any portion of the actuator electrode 12 that is unfixed. However, such warpage is avoided because substantially the entire surface of each actuator electrode 12 is bonded to the second circuit electrode 24. This is also true of the hinge electrodes 11.

Next, with reference to FIG. 3 to FIG. 11, a production method for a micro-mechanical structure system according to the present embodiment will be described. Note that, in the following cross-sectional views, dimensions along the thickness direction may not necessarily reflect the actual dimensions.

Figure 3:
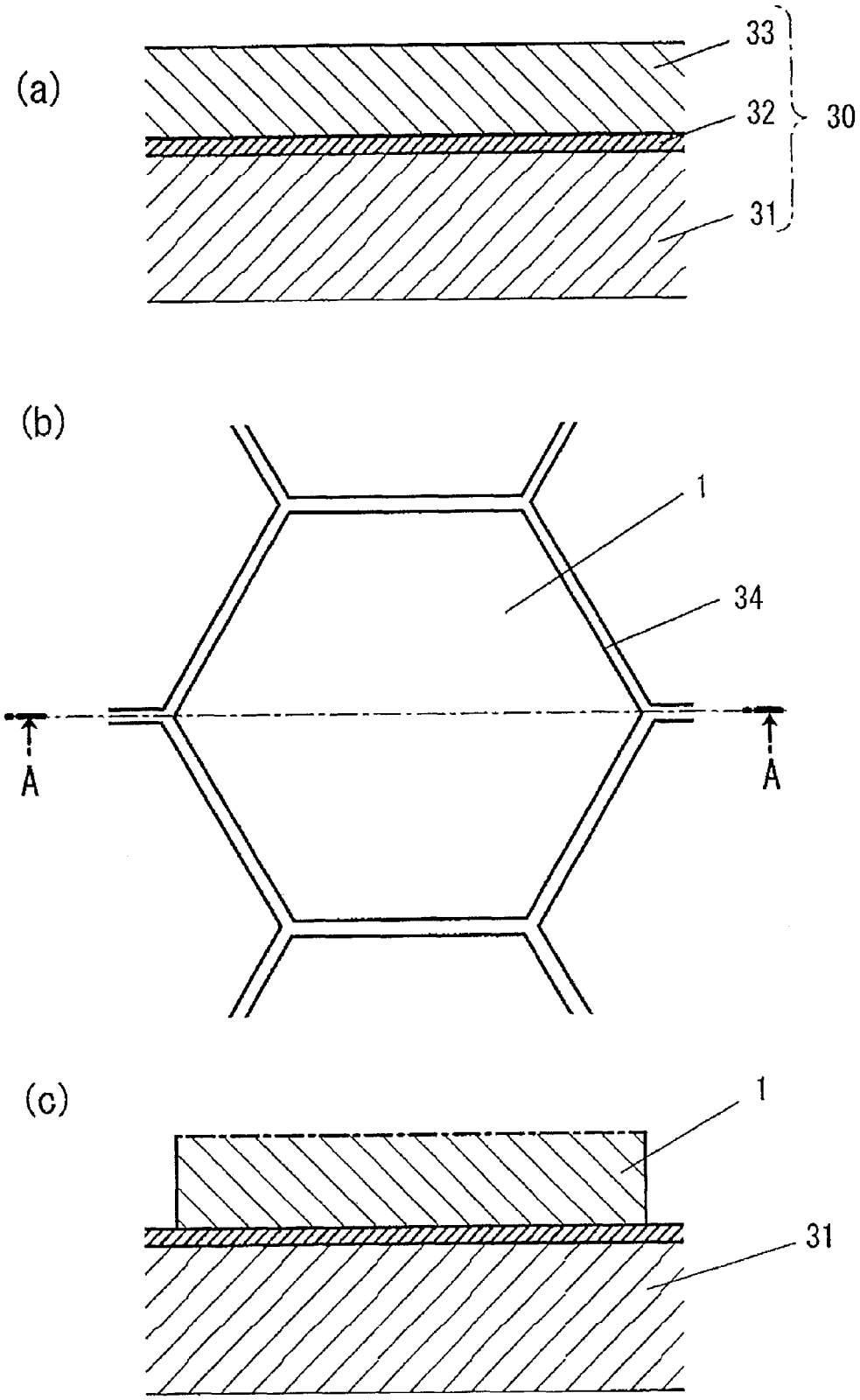
FIG. 3 Explanatory diagrams illustrating a structure forming step in a production method for a micro-mechanical structure system according to the present embodiment.

FIG. 3 is explanatory diagrams illustrating a structure forming step in a production method for a micro-mechanical structure system according to the present embodiment. FIG. 3(a) is a cross-sectional view of an SOI substrate; FIG. 3(b) is a plan view after the structure forming step; and FIG. 3(c) is a cross-sectional view after the structure forming step, taken along dot-dash line A-A.

As shown in FIG. 3(a), the SOI substrate (first substrate) 30 includes a handle substrate 31, an embedded insulating layer 32 (thickness: 0.5 to 1 µm), and a single-crystalline silicon layer 33.

As shown in FIG. 3(b) and FIG. 3(c), adjoining mirrors 1 are split apart by forming trenches 34. The width of the trenches 34 is 1 to 2 µm, for example. For the formation of the trenches 34, a known lithography technique which involves applying a photoresist on the single-crystalline silicon layer 33 and performing exposure and development through a mask having trench shapes, and a DRIE (DEEP REACTIVE ION ETCHING) technique are employed. By using a DRIE technique to form the trenches 34 from the surface of the single-crystalline silicon layer 33 to a depth reaching the embedded insulating layer 32, the single-crystalline silicon layer 33 can be split into the individual mirrors 1.

Figure 4:
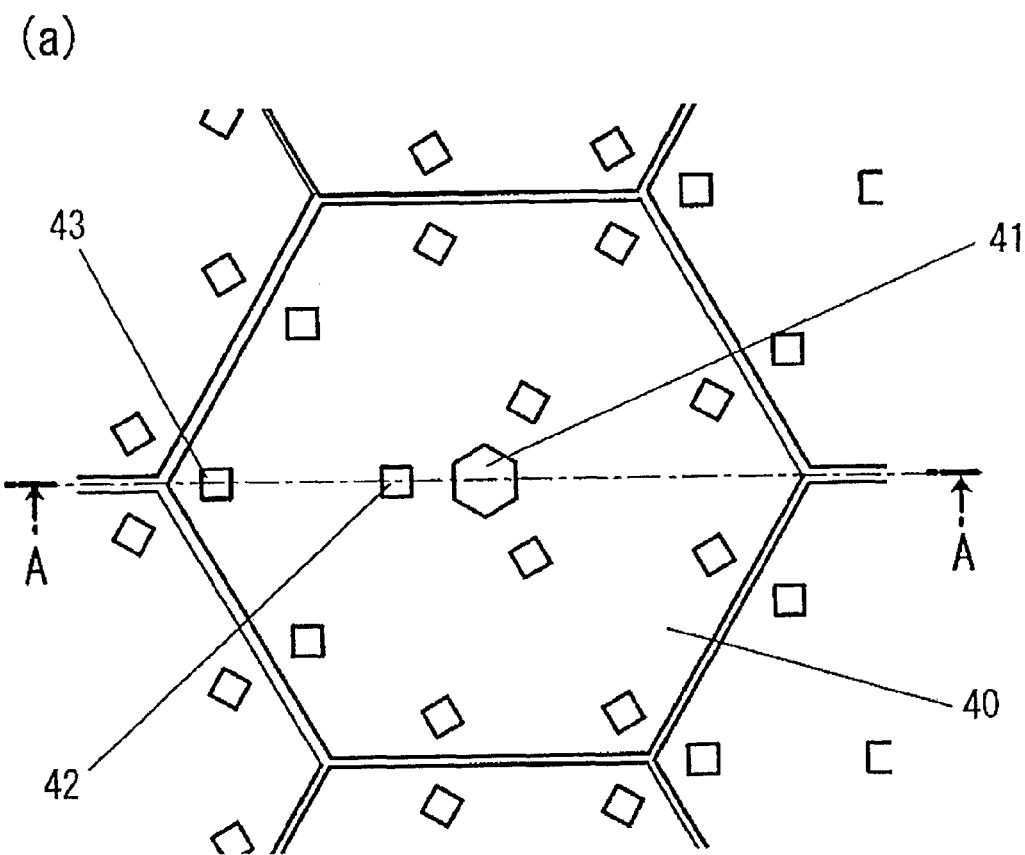
FIG. 4 Explanatory diagrams illustrating a first sacrificial layer forming step in a production method for a micro-mechanical structure system according to the present embodiment.
Figure 4:
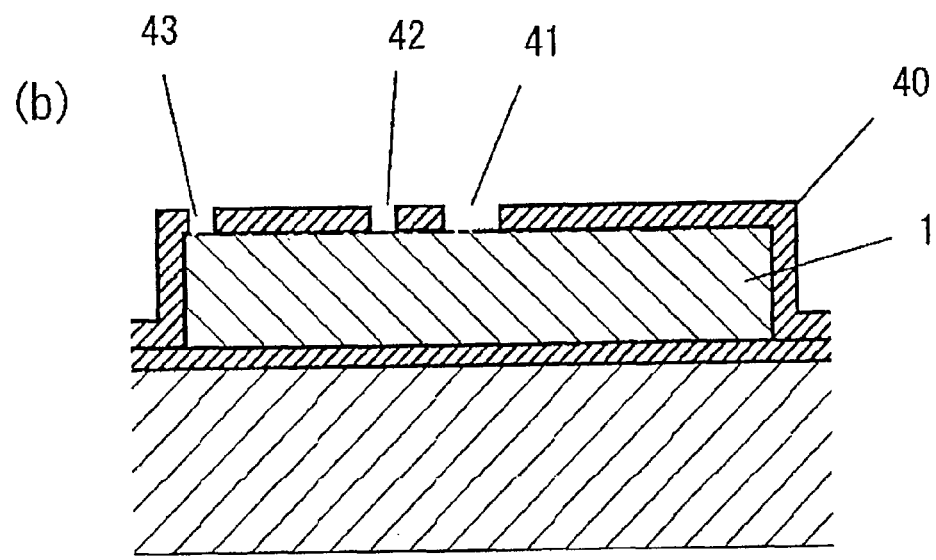

FIG. 4 is explanatory diagrams illustrating a first sacrificial layer forming step in a production method for a micro-mechanical structure system according to the present embodiment. FIG. 4(a) is a plan view after the first sacrificial layer forming step; and FIG. 4(b) is a cross-sectional view after the first sacrificial layer forming step, taken along dot-dash line A-A.

As shown in FIG. 4(a) and FIG. 4(b), after a first sacrificial layer (thickness: 2 to 3 μm) 40 is deposited, a via 41, vias 42, and vias 43 are formed in the first sacrificial layer 40. The via 41 and the vias 42 are provided near the central portion of each mirror 1, whereas nine vias 43 are provided near the outer periphery of each mirror 1.

The first sacrificial layer 40 is formed of PSG (phosphosilicate glass). PSG can be deposited by LPCVD (Low pressure chemical vapor deposition), using $SiH_4$ gas and simultaneously adding $PH_3$. Note that, before depositing the first sacrificial layer 40, a silicon oxide film (not shown) (thickness 200 nm) is preferably formed in advance by LPCVD. This silicon oxide film, which is not doped with any impurity, is provided between the first sacrificial layer 40 (PSG) and the mirror 1 to prevent the impurities in the PSG from diffusing into the mirror 1.

The via 41, vias 42, and vias 43 are formed by a lithography technique and an RIE (REACTIVE ION ETCHING) technique. The vias 41 to 43 penetrate through the first sacrificial layer 40, and expose portions of each mirror 1.

Figure 5:
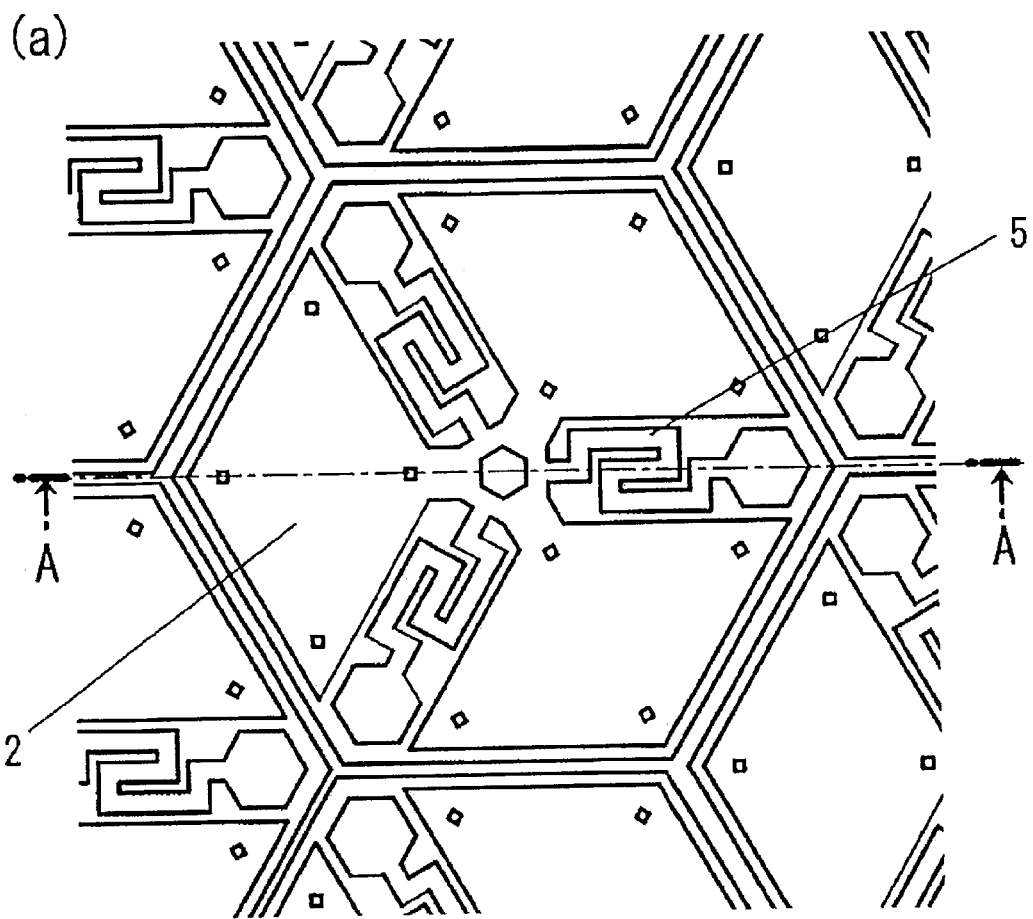
FIG. 5 Explanatory diagrams illustrating an elastic supporting member forming step in a production method for a micro-mechanical structure system according to the present embodiment.
Figure 5:
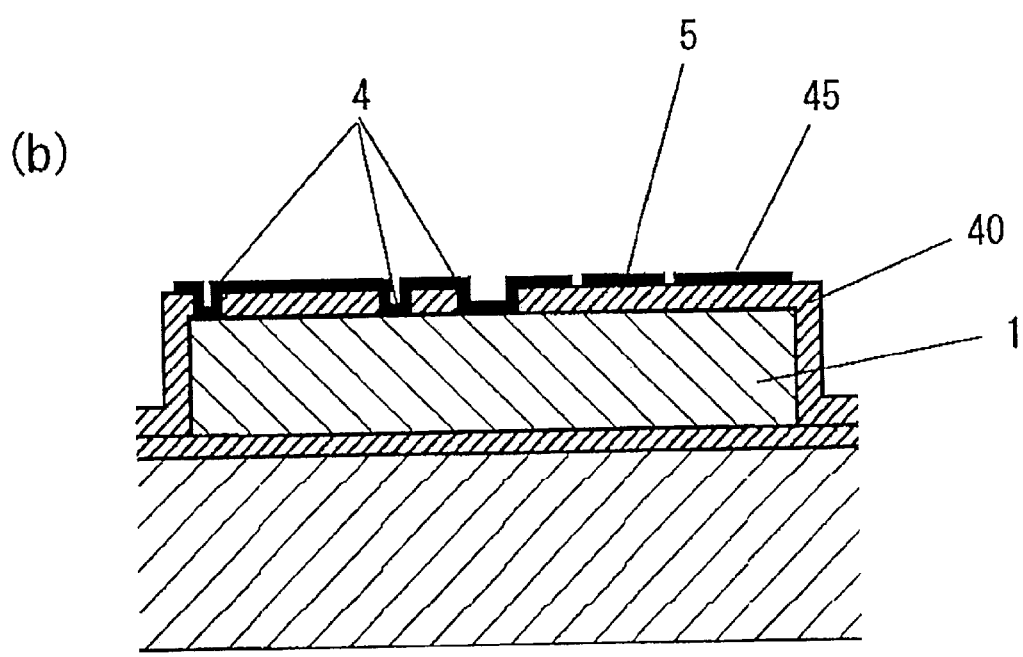

FIG. 5 is explanatory diagrams illustrating an elastic supporting member forming step in a production method for a micro-mechanical structure system according to the present embodiment. FIG. 5(a) is a plan view after the elastic supporting member forming step; and FIG. 5(b) is a cross-sectional view after the elastic supporting member forming step, taken along dot-dash line A-A.

As shown in FIG. 5(a) and FIG. 5(b), a hinge layer 45 is deposited on the first sacrificial layer 40. The hinge layer 45 is a polysilicon layer having a thickness of 0.3 μm to 1 μm, for example. Portions of the hinge layer 45 extend into the via 41, vias 42, and vias 43, which are holes provided in the first sacrificial layer 40 shown in FIG. 4, so as to form the first link portions 4 and the mirror link post 8 linking the mirror 1 to the hinge members 6.

Formation of the hinge layer 45 is performed in the following procedure.

First, polysilicon is deposited over the entire first sacrificial layer 40 by LPCVD. After depositing PSG (not shown) further thereupon to a thickness of 200 nm by LPCVD, an anneal is performed at 1050° C. for 1 hour. As a result, the polysilicon is doped with impurities from both sides by PSG so as to have a reduced resistance, while its residual stress is also alleviated.

Next, a photoresist is applied, and a mask defining the shape of the hinge layer 45 is used to perform an exposure and development for patterning. Thereafter, by RIE, a hard mask is formed by first etching the PSG, and then the polysilicon is etched to form the shape of the hinge layer 45. Finally, the photoresist is removed, and the PSG hard mask is removed by RIE.

Herein, each mirror 1 and each mirror link post 8 are directly deposited and coupled by LPCVD, without employing any adhesion members or the like. Moreover, the mirror link post 8 and the hinge members 6 are formed integrally. Thus, each movable site composed of the mirror 1, the mirror link post 8, and the hinge members 6 has no linking sites that are based on bonding. Therefore, a highly reliable micro-mechanical structure system can be provided which will not suffer destruction or the like due to deterioration of adhered portions even after having been driven and vibrated for long periods of time.

Figure 6:
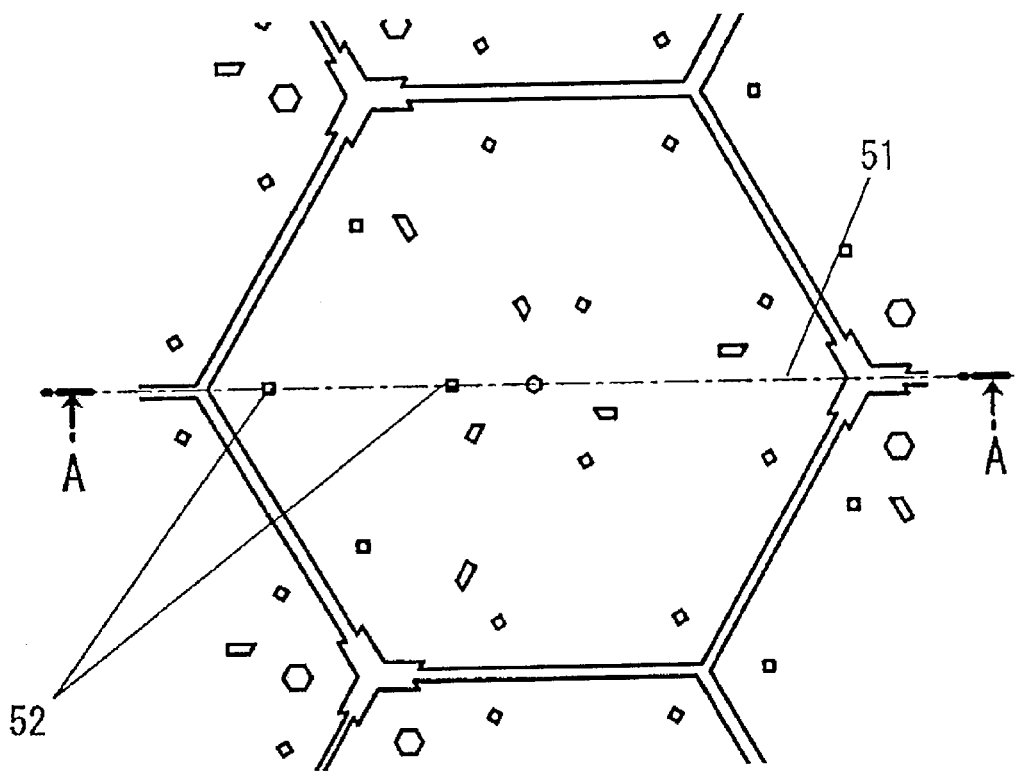
FIG. 6 Explanatory diagrams illustrating a second sacrificial layer forming step in a production method for a micro-mechanical structure system according to the present embodiment.
Figure 6:
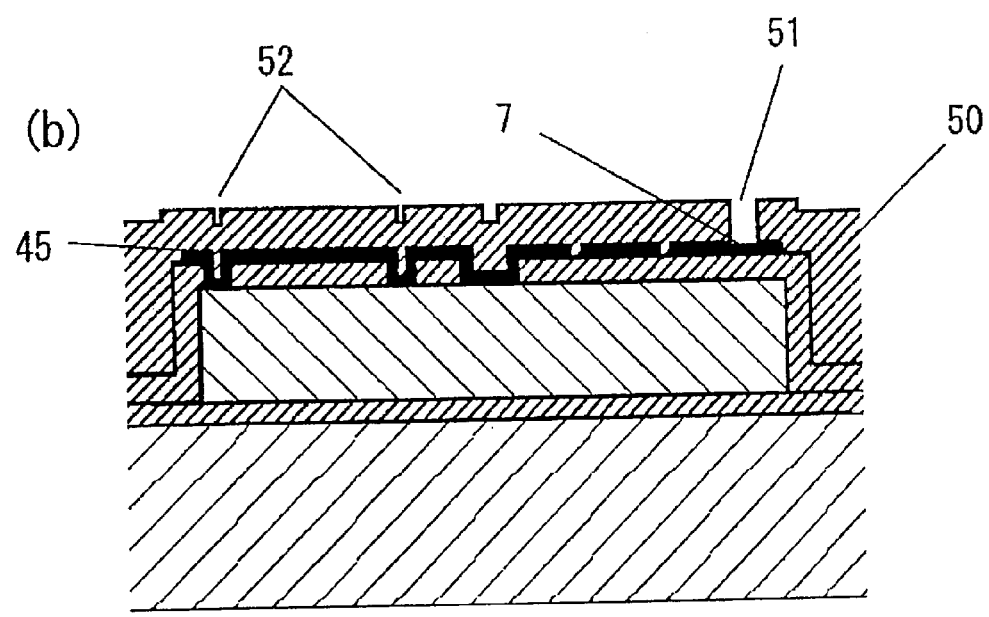

FIG. 6 is explanatory diagrams illustrating a second sacrificial layer forming step in a production method for a micro-mechanical structure system according to the present embodiment. FIG. 6(a) is a plan view after the second sacrificial layer forming step; and FIG. 6(b) is a cross-sectional view after the second sacrificial layer forming step, taken along dot-dash line A-A.

As shown in FIG. 6(a) and FIG. 6(b), after a second sacrificial layer 50 is deposited, vias 51 are formed in the second sacrificial layer 50. The second sacrificial layer 50 has a thickness of 3 μm, for example. The vias 51 are formed above the hinge outer peripheral ends 7 so as to expose the hinge outer peripheral ends 7. The holes 52 are recesses which are formed on the upper face of the sacrificial layer 50 so as to conform to dents in the hinge layer 45.

The second sacrificial layer 50 is formed of PSG, and is deposited through the same LPCVD as the first sacrificial layer 40. The film formation of the second sacrificial layer 50 is performed under conditions defined by a temperature 400° C. and a pressure of 300 mTorr, with a deposition rate of 12.5 nm/min, for example. Its thickness can be kept under highly precise management through controlling of the deposition time, and can be reduced to an error of several dozen nm from a target thickness, for example. Formation of the vias 51 is performed by lithography technique and RIE.

Figure 7:
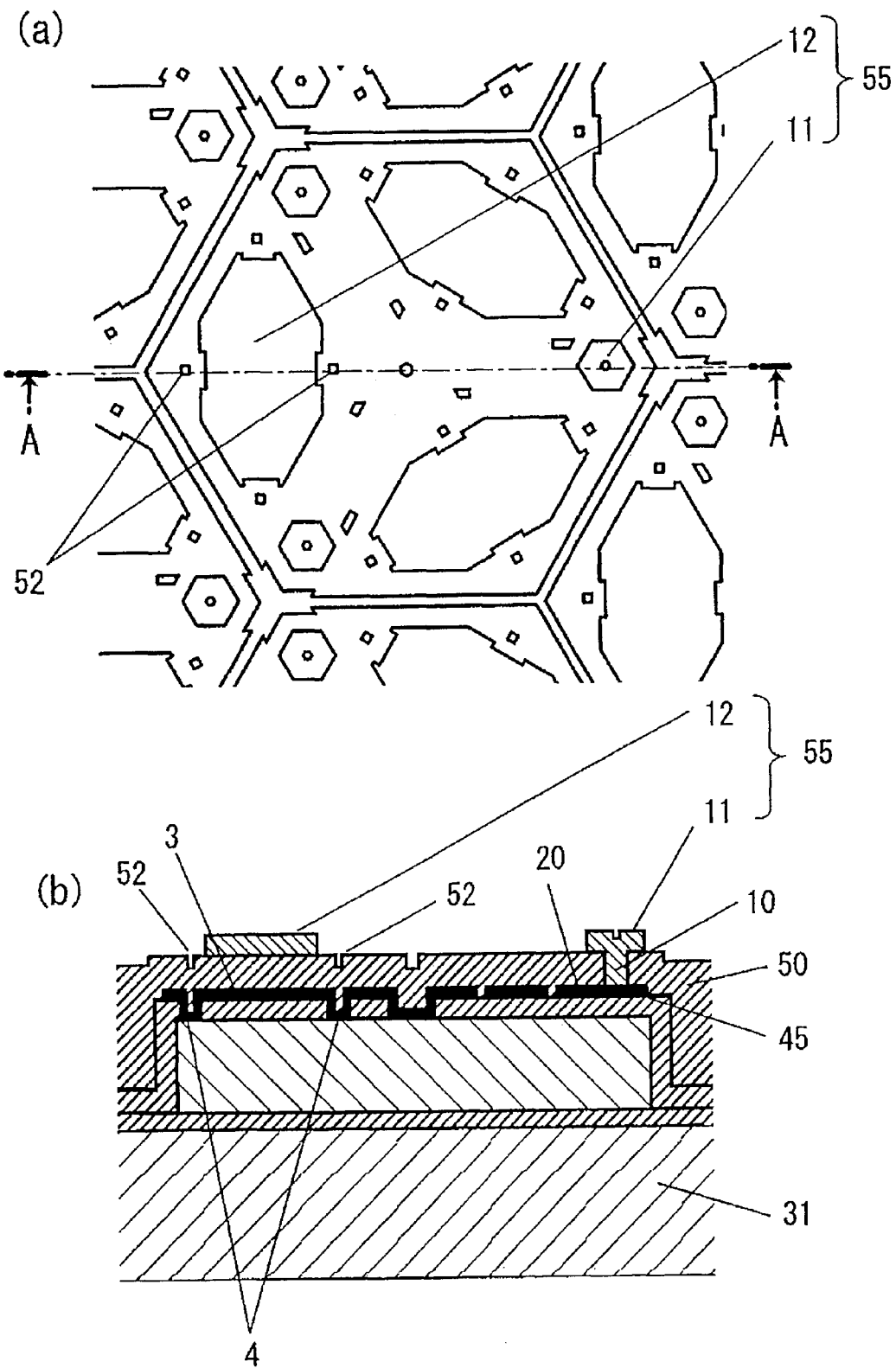
FIG. 7 Explanatory diagrams illustrating a stationary electrode forming step in a production method for a micro-mechanical structure system according to the present embodiment.

FIG. 7 is explanatory diagrams illustrating a stationary electrode forming step in a production method for a micro-mechanical structure system according to the present embodiment. FIG. 7(a) is a plan view after the stationary electrode forming step; and FIG. 7(b) is a cross-sectional view after the stationary electrode forming step, taken along dot-dash line A-A.

As shown in FIG. 7(a) and FIG. 7(b), a stationary electrode layer 55 is formed by deposition on the second sacrificial layer 50. The stationary electrode layer 55 is a polysilicon layer having a thickness of 1 μm, for example. Some portions of the stationary electrode layer 55 form the actuator electrodes 12 (second stationary electrodes), whereas other portions extend into the vias 51 (see FIG. 6) to form the hinge post 10 and the hinge electrodes 11 (first stationary electrodes). Since the hinge post 10 and the hinge layer 45 are linked, they are at the same electrically potential. Thus, the intermediate electrodes 3 provided on the hinge layer 45 can be set to a desired potential through the hinge electrodes 11.

The actuator electrodes 12 are formed so as not to overlap the holes 52. If the actuator electrodes 12 were formed so as to overlap the holes 52, portions of the actuator electrodes 12 would extend into the holes 52 so as to allow rod-like structures to be formed toward the intermediate electrodes 3, thus resulting in the problem of a decreased relative distance between each actuator electrode 12 and each intermediate electrode 3, such that the intermediate electrode 3 might collide when displaced through pivoting. By forming the actuator electrodes 12 so as not overlap the holes 52, it becomes possible to avoid a decrease in the relative distance between each actuator electrode 12 and each intermediate electrode 3.

Formation of the stationary electrode layer 55 is performed through a similar procedure to that of the hinge layer 45. First, polysilicon is formed over the entire second sacrificial layer 50 by LPCVD. After forming a film of PSG (not shown) further thereupon to a thickness of 200 nm by LPCVD, an anneal is performed at 1050° C. for 1 hour. Next, a photoresist is applied, and a mask defining the shape of the stationary electrode layer 55 is used to perform an exposure and development for patterning. Thereafter, by RIE, a hard mask is formed by first etching the PSG. Then, the polysilicon is etched to form the shape of the stationary electrode layer 55. Finally, the photoresist is removed, and the PSG hard mask is removed by RIE.

Herein, the relative distance between each intermediate electrode 3 and each actuator electrode 12 along a direction which is perpendicular to the handle substrate 31 is determined by the thickness of the second sacrificial layer 50. Since the second sacrificial layer 50 is formed by LPCVD deposition so that the error can be reduced to several dozen nm, variations in the relative distance between each intermediate electrode 3 and each actuator electrode 12 can also be reduced. As a result, it can be ensured that variations in the electrostatic forces occurring between the intermediate electrodes 3 and the actuator electrodes 12 are very little.

Figure 24:
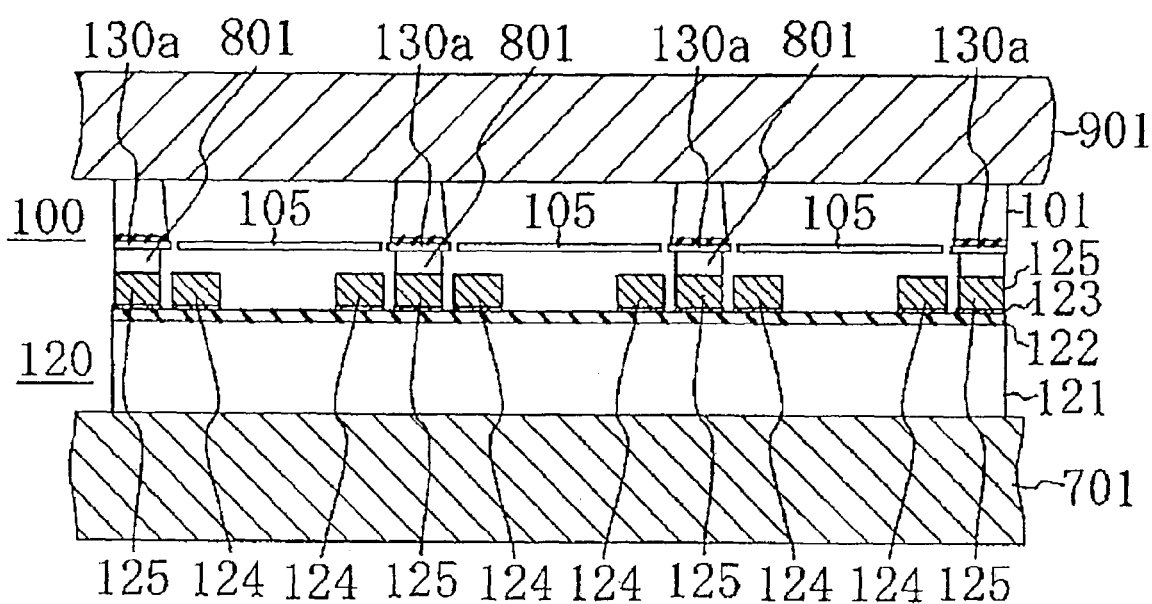
FIG. 24 A cross-sectional view of a conventional mirror array.

The positional precision, along a direction which is parallel to the handle substrate 31, of the actuator electrodes 12 formed in the stationary electrode layer 55 is deter mined by the alignment precision of the mask used during exposure, and has only a small error of several μm (10 μm or less, e.g. 5 μm or less, and preferably 2 μm or less). This value is much smaller than the misalignment (about 20 μm) associated with the conventional bonding method which has been described with reference to FIG. 24. Therefore, the misalignments between the intermediate electrodes 3 and the actuator electrodes 12 within the hinge layer 45 can also be reduced to be very little. As a result, it can be ensured that: there is little deviation in the points of application of electrostatic forces; there is little change in the rotation moments; and there is little error in the pivoting operation of each mirror 1.

Figure 8:
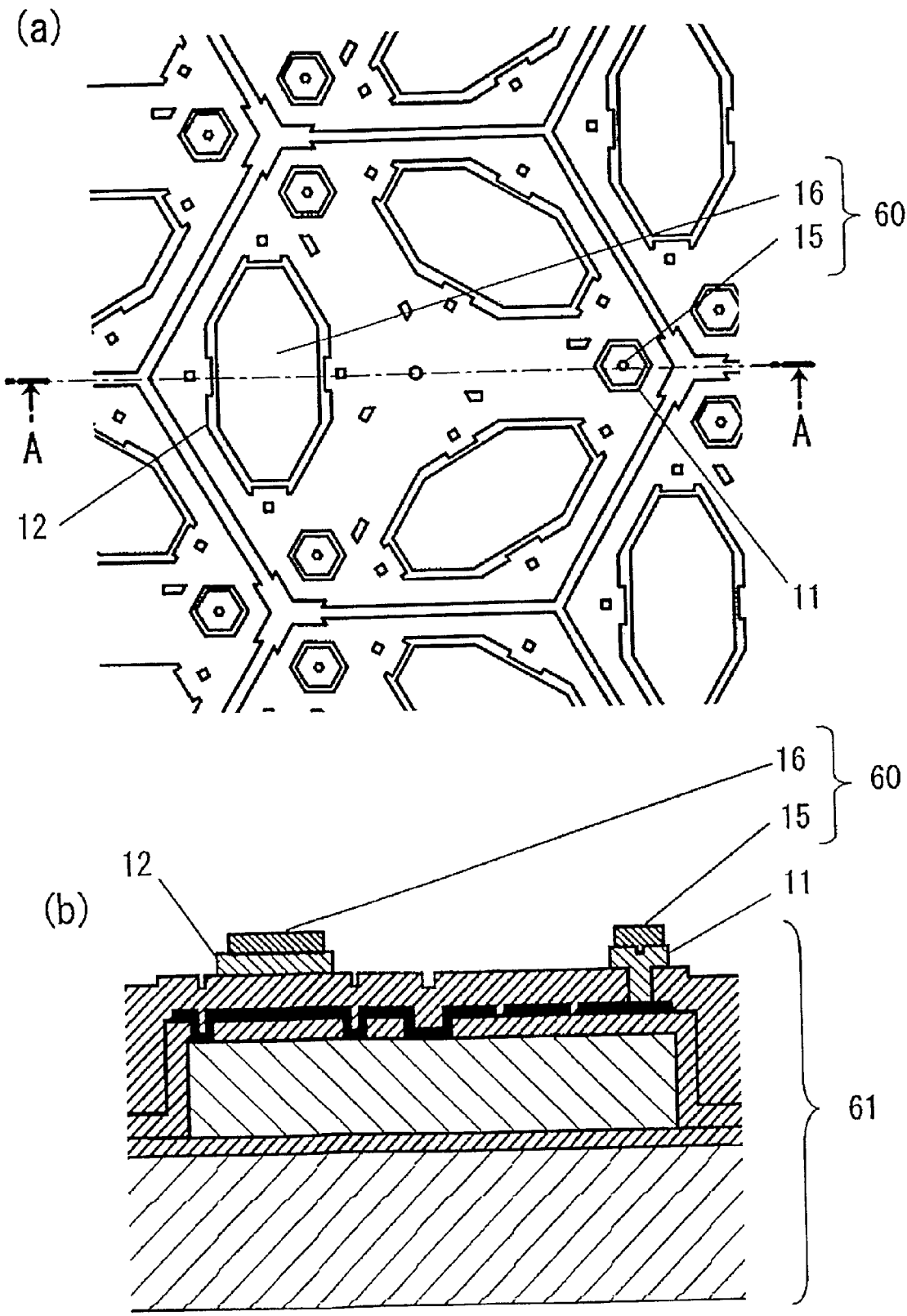
FIG. 8 Explanatory diagrams illustrating a step of forming adhesion layers in a production method for a micro-mechanical structure system according to the present embodiment.

FIG. 8 is explanatory diagrams illustrating a step of forming adhesion layers in a production method for a micromechanical structure system according to the present embodiment. FIG. 8(a) is a plan view after the deposition of adhesion layers; and FIG. 8(b) is a cross-sectional view after the deposition of adhesion layers, taken along dot-dash line A-A.

As shown in FIG. 8(a) and FIG. 8(b), an adhesion layer 60 having an Au film with a thickness of 2 to 3 μm is formed on the electrodes 11 and 12. Between the Au film and the stationary electrode layer 55, a thin Cr film (not shown) is also formed to enhance adhesion between the Au film and the polysilicon of the stationary electrode layer 55. The first adhesion members 15 and the second adhesion members 16 composing the adhesion layer 60 function as adhesives in terms of bonding to the base 22. Each first adhesion member 15 and each second adhesion member 16 are formed over substantially the entire surfaces of the hinge electrode 11 and the actuator electrode 12, respectively, while leaving an interspace of 1 to 2 μm toward the outer periphery.

Formation of the adhesion layer 60 can be performed by a known lift-off technique. A photoresist is applied, and a mask defining the shape of the adhesion layer 60 is used to perform an exposure and development. Thereafter, Cr and Au films are formed by sputtering technique, and finally the photoresist and the unnecessary portions are removed.

Herein, the hinge electrodes 11 and the actuator electrodes 12 are formed by LPCVD so as to be substantially coplanar, and the first adhesion members 15 and the second adhesion members 16 formed thereupon are also formed so as to be coplanar.

Through the above steps, fabrication of a mirror wafer 61 is completed.

Figure 9:
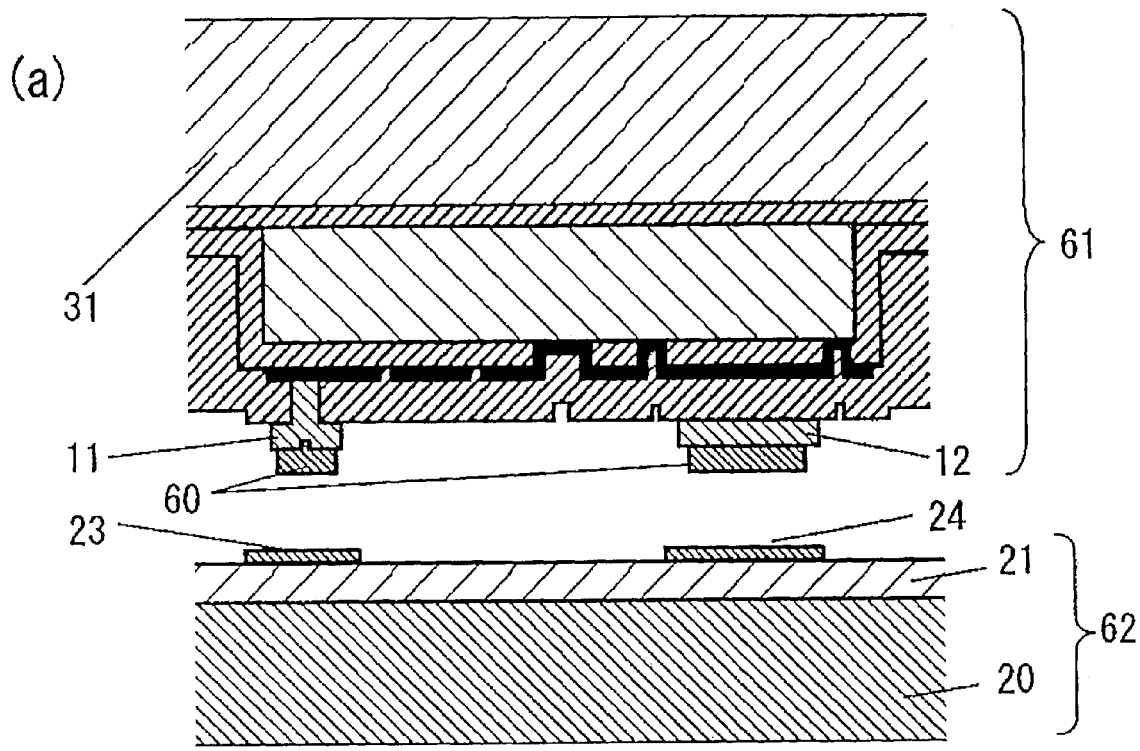
FIG. 9 Explanatory diagrams illustrating a bonding step in a production method for a micro-mechanical structure system according to the present embodiment.
Figure 9:
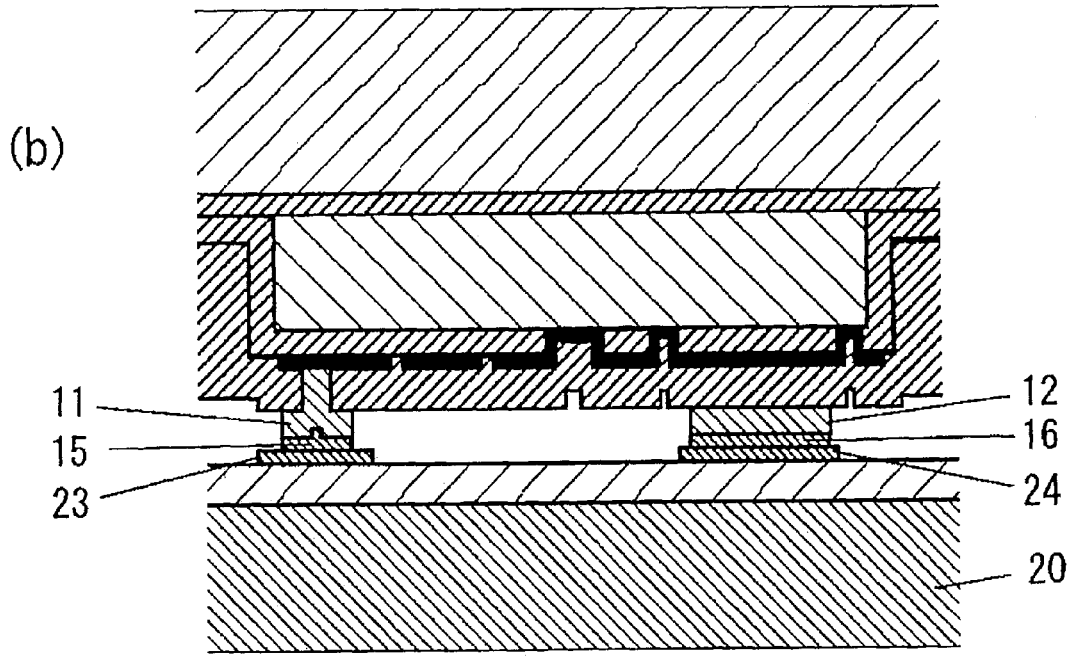

FIG. 9 is explanatory diagrams illustrating a bonding step in a production method for a micro-mechanical structure system according to the present embodiment. FIG. 9(a) is a cross-sectional view before the bonding step; and FIG. 9(b) is a cross-sectional view after the bonding step.

As shown in FIG. 9(a) and FIG. 9(b), the mirror wafer 61 is disposed so that the stationary electrode layer 60 side thereof opposes a CMOS wafer 62. On the surface of the CMOS wafer 62, which includes the circuit section 20 and the insulating layer 21, the first circuit electrodes 23 and the second circuit electrodes 24 are formed as Au films. Herein, the hinge electrodes 11 and the first circuit electrodes 23 are formed so as to be in opposing positions, whereas the actuator electrodes 12 and the second circuit electrodes 24 are formed so as to be in opposing positions.

Bonding between the mirror wafer 61 and the CMOS wafer 62 can be performed by a low-temperature plasma bonding, for example. First, the surfaces of the first circuit electrodes 23, the second circuit electrodes 24, and the adhesion layer 60 are activated by Ar plasma. Next, at a temperature (e.g., about 200° C.) low enough not to destroy the circuit section 20 which is formed of CMOS, the wafers are allowed to abut with each other with a predetermined pressure. As a result, the hinge electrodes 11 and the first circuit electrodes 23, and the actuator electrodes 12 and the second circuit electrodes 24 mechanically couple, via the first adhesion members 15 and the second adhesion members 16, respectively. Thus, the mirror wafer 61 and the CMOS wafer 62 are formed integrally and also electrically coupled, thus making it possible to supply a driving signal from the circuit section 20 which is on the CMOS wafer 62 side, via the actuator electrodes 12 and the hinge electrodes 11.

In such a bonding step, no high precision is required for the alignment between the mirror wafer 61 and the CMOS wafer 62 along any in-plane direction. So long as a mechanically sufficient bonding strength is obtained and electrical connection is ensured, considerable misalignments may be tolerated. As a result, the production yield is improved, and a micromechanical structure system can be realized at low cost.

At this bonding step, if a misalignment of a size exceeding 10 μm occurs between the mirror wafer 61 and the CMOS wafer 62, a portion of an actuator electrode 12 may overhang beyond the second circuit electrode 24 along the lateral direction, for example. Even in such cases, according to the present embodiment, not much problem will occur so long as electrical conduction is ensured between the upper and lower electrodes 12 and 24.

Thus, the stationary electrode section according to the present embodiment is significantly characterized in that it includes a first electrode layer (stationary electrode 13) which is positioned relative to the movable structure and a second electrode layer (circuit electrode 25) which is positioned relative to the base 22, and that the stationary electrode 13 and the circuit electrode 25 are bonded directly or via an electrically conductive substance. As a result, the misalignment of the stationary electrode 13 with respect to the movable structure and the misalignment of the circuit electrode 25 with respect to the base 22 are both reduced to 10 μm or less (preferably 2 μm or less). Thus, the positional relationship between the movable structure and the stationary electrode 13 is defined with a high precision, such that the movable structure can accurately pivot.

In the present embodiment, there are no bonding sites other than the aforementioned sites, and the movable site does not include any bonded portions. Therefore, the bonded portions are unlikely to deteriorate even after long periods of driving, and a highly reliable micro-mechanical structure system can be realized.

The shape of each hinge electrode 11 as projected on the first circuit electrode 23 is smaller than the outer shape of the first circuit electrode 23. After bonding, substantially the entire bonding surface of each hinge electrode 11 is allowed to adhere to the first circuit electrode 23 by way of the first adhesion member 15, whereby warpage of the hinge electrode 11 can be prevented. Similarly, the shape of each actuator electrode 12 as projected on the second circuit electrode 24 is also smaller than the outer shape of the second circuit electrode 24, so that warpage of the actuator electrode 12 can be prevented.

Since the hinge electrodes 11 and the actuator electrodes 12 are formed so as to be coplanar, the first circuit electrodes 23 and the second circuit electrodes 24 may also be formed so as to be coplanar. This makes it unnecessary to keep their respective heights under independent management. Thus, the number of steps can be reduced, and a low cost micro-mechanical structure system can be provided.

Figure 10:
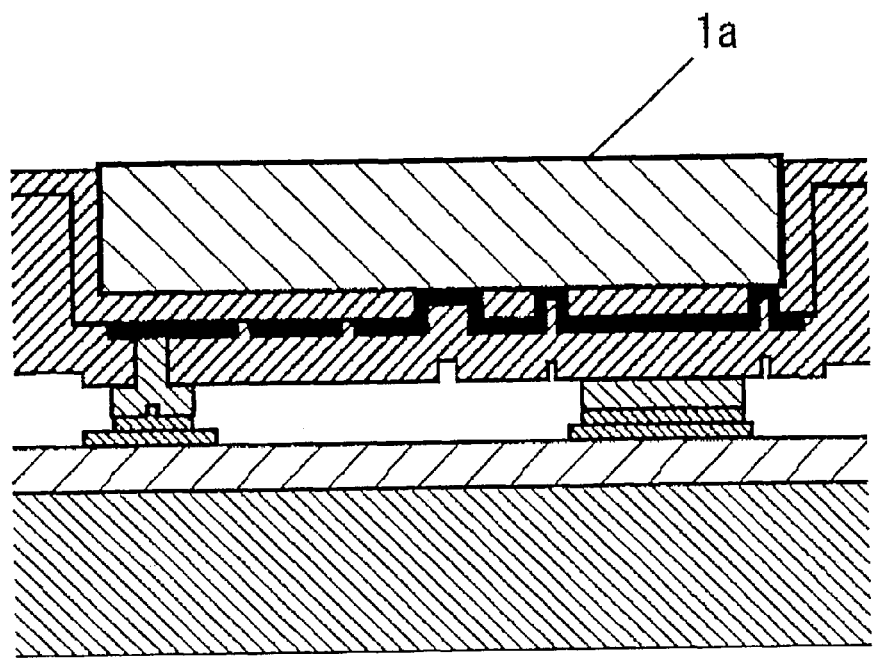
FIG. 10 Cross-sectional views illustrating a movable structure exposing step and a reflecting film forming step in a production method for a micro-mechanical structure system according to the present embodiment.
Figure 10:
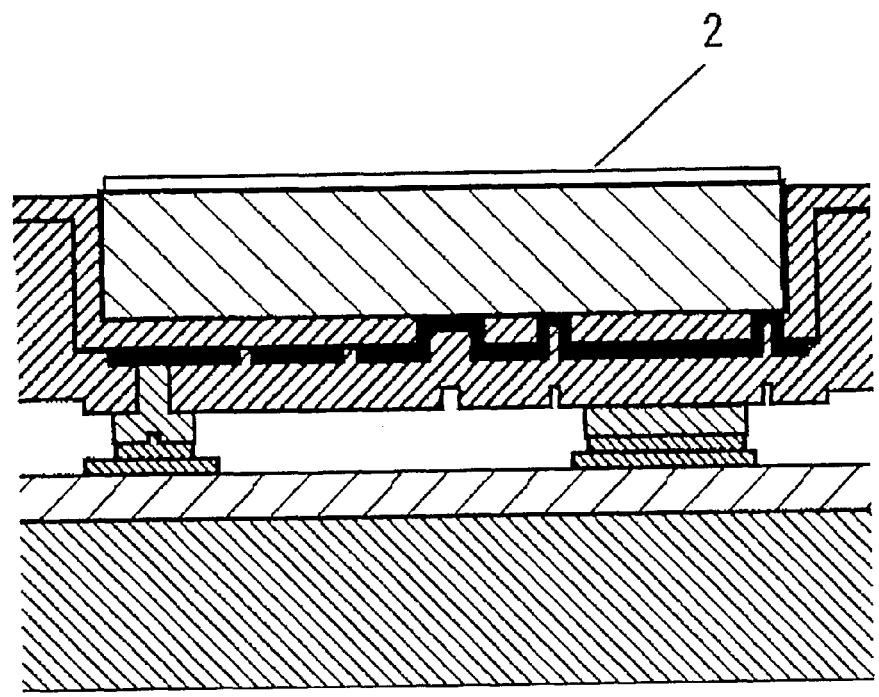

FIG. 10 is cross-sectional views illustrating a movable structure exposing step and a reflecting film forming step in a production method for a micro-mechanical structure system according to the present embodiment. FIG. 10(a) is a cross-sectional view after the movable structure exposing step; and FIG. 10(b) is a cross-sectional view after the reflecting film forming step.

As shown in FIG. 10(a), the handle substrate 31 and the embedded insulating layer 32 are removed to expose a surface 1a of the mirror 1. After removing the handle substrate 31 by cutting, the embedded insulating layer 32 is removed by RIE.

As shown in FIG. 10(b), the light reflecting film 2 is formed by an Al— or Ag— sputtering technique and by lift-off.

Figure 11:
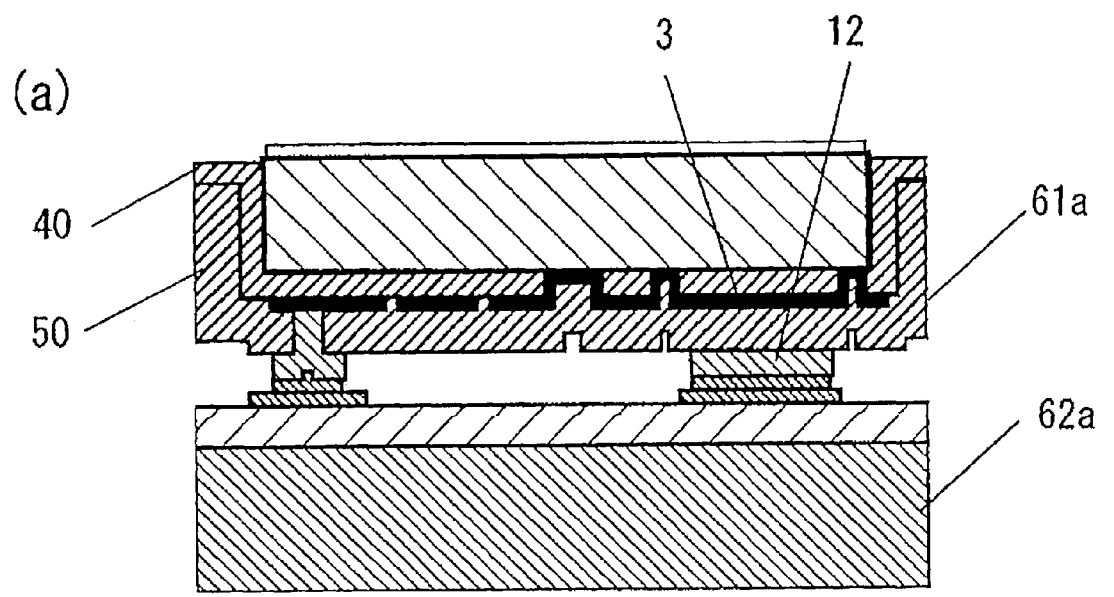
FIG. 11 Cross-sectional views illustrating a sacrificial layer removing step in a production method for a micro-mechanical structure system according to the present embodiment.
Figure 11:
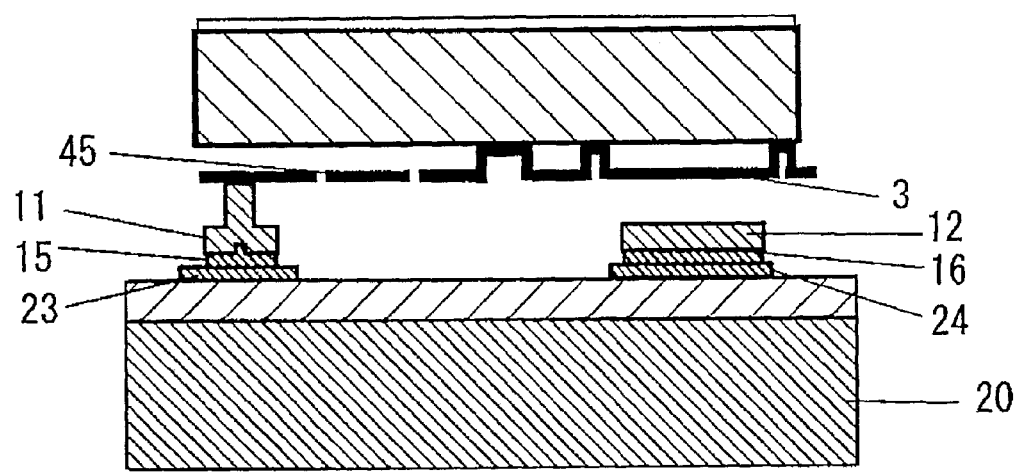

FIG. 11 is cross-sectional views illustrate a sacrificial layer removing step in a production method for a micro-mechanical structure system according to the present embodiment. FIG. 11(a) is a cross-sectional view after dicing; and FIG. 11(b) is a cross-sectional view after the sacrificial layer removing step.

Although FIG. 11(a) conveniently shows one mirror 1 being cut out, the micromirror device according to the present embodiment includes about one thousand mirrors 1. Moreover, according to the production method of the present embodiment, a plurality of micromirror devices can be formed from a single wafer. In this case, the wafer is to be cut out into each micromirror device by dicing.

In the example shown in FIG. 11(a), cutting is performed at a mirror wafer cutting site 61a and a CMOS wafer cutting site 62a. At dicing, the first sacrificial layer 40 and the second sacrificial layer 50 are not removed, so that shreds from dicing will not stray in between the intermediate electrodes 3 and the actuator electrodes 12. Thus, a highly reliable micro-mechanical structure system can be provided.

As shown in FIG. 11(b), from each micromirror array that has been cut out through dicing, the first sacrificial layer 40 and the second sacrificial layer 50 are removed by a sacrificial layer etching using an HF solution, for example. When the first sacrificial layer 40 and the second sacrificial layer 50 have been removed, the hinge layer 45 becomes able to freely deform. As a result, by supplying driving voltages from the circuit section 20, the intermediate electrodes 3 and the actuator electrodes 12 can be allowed to operate as electrostatic actuators.

Thus, according to the present embodiment, the mirror 1 is composed of a single-crystalline material, and bonding sites exist only between the upper stationary electrode 13 and the lower stationary electrode 25, so that a highly planar mirror which is excellent in terms of optical characteristics is realized. Moreover, bonding with a highly precise alignment is not required, and furthermore the movable site does not include any bonded portions. Thus, a highly reliable micromechanical structure system whose bonded portions are unlikely to deteriorate can be provided.

Moreover, the shapes of each hinge electrode 11 and each actuator electrode 12 as projected on the first circuit electrode 23 and the second circuit electrode 24, respectively, are smaller than the outer shapes of the first circuit electrode 23 and the second circuit electrode 24. Therefore, each hinge electrode 11 and each actuator electrode 12 can be bonded to the first circuit electrodes 23 and the second circuit electrodes 24 over substantially the entire surfaces. As a result, there can be provided a micro-mechanical structure system in which the relative distances between the intermediate electrodes 3 and the actuator electrodes 12 can be precisely maintained without warpage or the like.

Moreover, the second sacrificial layer 50, which determines the relative distances between the intermediate electrodes 3 and the actuator electrodes 12, is formed by LPCVD while keeping its thickness under highly precise management. Therefore, there can be provided a micro-mechanical structure system having an excellent controllability, which allows little variation in the relative distances and little variation in the electrostatic forces.

Moreover, the misalignments between the intermediate electrodes 3 and the actuator electrodes 12 along any in-plane direction can be minimized so long as the accuracy of lithography allows. Therefore, variation in each center position of driving serving as a point of application of an electrostatic force can be reduced, and there is little variation in size of the rotation moments during the pivoting operation of the mirror 1. Thus, a micro-mechanical structure system which is capable of highly precisely controlling its pivoting operation can be provided.

Moreover, the hinge electrodes 11 and the actuator electrodes 12 are formed so as to be coplanar. Therefore, the first circuit electrodes 23 and the second circuit electrodes 24 may also be formed so as to be coplanar. This makes it unnecessary to keep their respective heights under independent management. Thus, the number of steps can be reduced, and a low cost micro-mechanical structure system can be provided.

Moreover, the elastic supporting member 10 is disposed between the mirror 1 and the base 22. Thus, when the mirrors 1 are placed in an array, each entire elastic supporting member 10 is completely accommodated under each mirror 1, thus reducing the area that does not function as mirrors, so that a micro-mechanical structure system with little loss of light amount can be provided.

Moreover, the intermediate electrodes 3 are provided between the actuator electrodes 12 and the mirror 1, such that electrostatic actuators are constituted by the actuator electrodes 12 and the intermediate electrodes 3. As a result, the distance between the electrodes can be reduced, and a micromechanical structure system which provides large electrostatic forces and which is capable of low-voltage driving can be provided.

Moreover, since the sacrificial layers are removed after dicing, there can be provided a highly reliable micro-mechanical structure system in which shreds from dicing never stray in between the intermediate electrodes 3 and the actuator electrodes 12.

Embodiment 2

Figure 12:
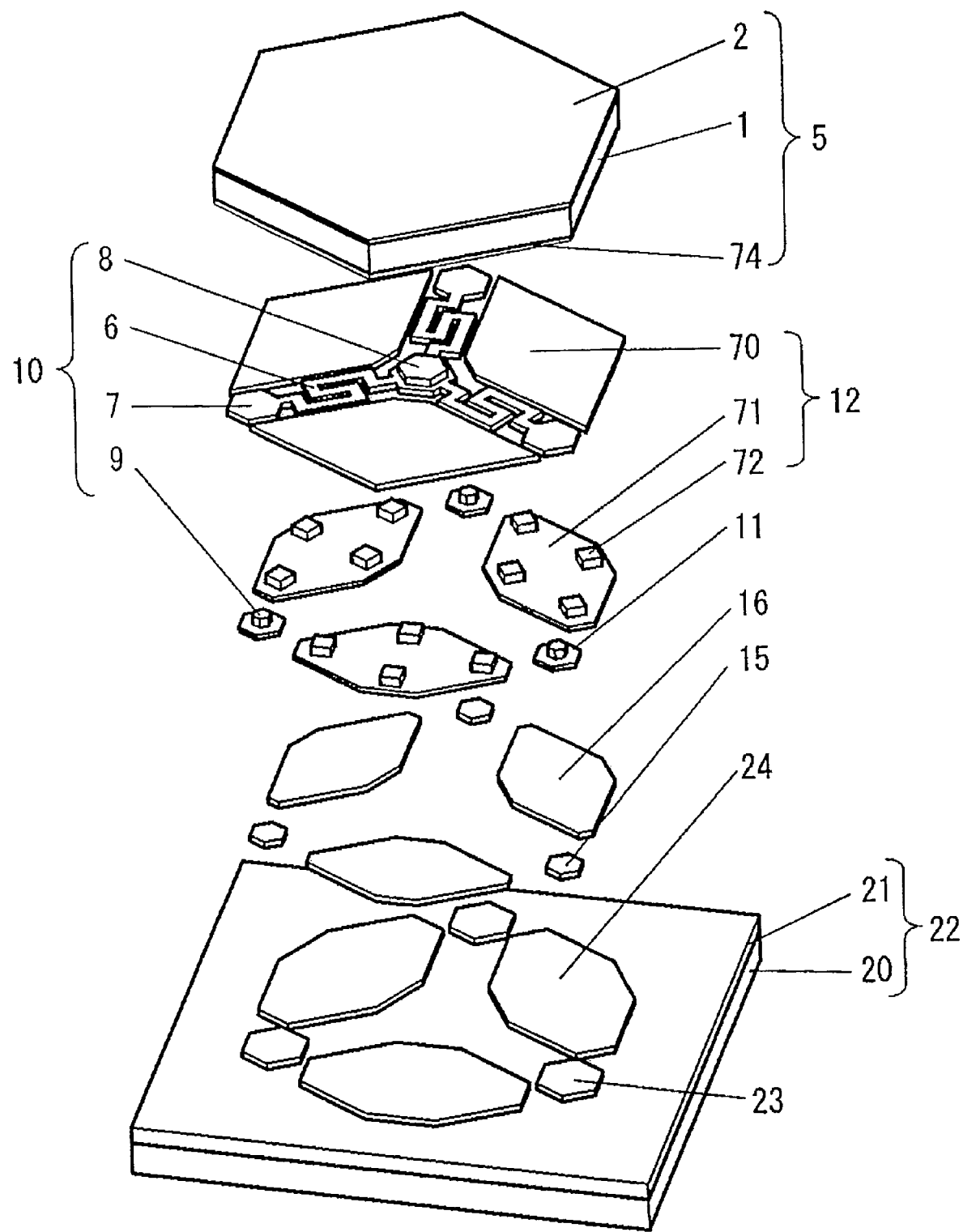
FIG. 12 An exploded perspective view of a micro-mechanical structure system according to Embodiment 2 of the present invention.

FIG. 12 is an exploded perspective view of a micro-mechanical structure system (micromirror device) according to Embodiment 2 of the present invention. In FIG. 12, component elements which are identical to those in Embodiment 1 will be denoted by the same numerals, and the descriptions thereof will be omitted.

As shown in FIG. 12, intermediate electrodes 70 are formed of polysilicon so as to be coplanar with the hinge members 6. The intermediate electrodes 70 are plate electrodes which are not connected to the hinge members 6 and will not be displaced even when the hinge members 6 are deformed. Electrode bonding portions 71 are formed of polysilicon, and are bonded to the second circuit electrodes 24 by way of the second adhesion members 16. Second link portions 72 are formed of polysilicon, and allow the intermediate electrodes 70 to be linked to the electrode bonding portions 71 in an electrically conducting manner. Second link portions 72 transmit control signals generated in the circuit section 20 to the intermediate electrodes 70. Each intermediate electrode 70, each electrode bonding portion 71, and each second link portion 72 constitute an actuator electrode 12 (second stationary electrode). The intermediate electrodes 70 constitute electrostatic actuators together with the mirror 1. Herein, each electrostatic actuator is constituted not by the mirror 1 and an actuator electrode 12, but by the mirror 1 and an intermediate electrode 70 which is provided between the actuator electrode 12 and the mirror 1. As a result, the distance between the electrodes can be reduced, and a micro-mechanical structure system which provides large electrostatic forces and which is capable of low-voltage driving can be provided.

On the mirror 1, a stress adjustment film 74, which is formed with the same material and substantially the same thickness and shape as those of the light reflecting film 2, is formed over the opposite face from the light reflecting film 2. If the mirror 1 and the light reflecting film 2 were of different materials, warpage might occur in response to fluctuations in ambient temperature, due to a difference in their coefficients of thermal expansion. In the case where the mirror 1 is required to have a highly precise planarity, the rigidity which emanates from the thickness of the mirror 1 alone may not be able to suppress the warpage so as to be within a tolerable value. Therefore, by forming a film of the same material and shape as those of the light reflecting film 2 on the opposite face, the distribution of coefficients of thermal expansion along the thickness direction can be made symmetric, thus preventing warpage. Note that the material of the stress adjustment film 74 does not need to be the same as that of the light reflecting film 2, but may be any other material whose coefficient of thermal expansion is close to that of the material of the light reflecting film 2. The mirror 1, the light reflecting film 2, and the stress adjustment film 74 constitute the movable structure 5.

Next, with reference to FIG. 13 to FIG. 14, a production method for a micro-mechanical structure system according to Embodiment 2 of the present invention will be described. Note that the description for any step that is identical to that in Embodiment 1 will be omitted.

Figure 13:
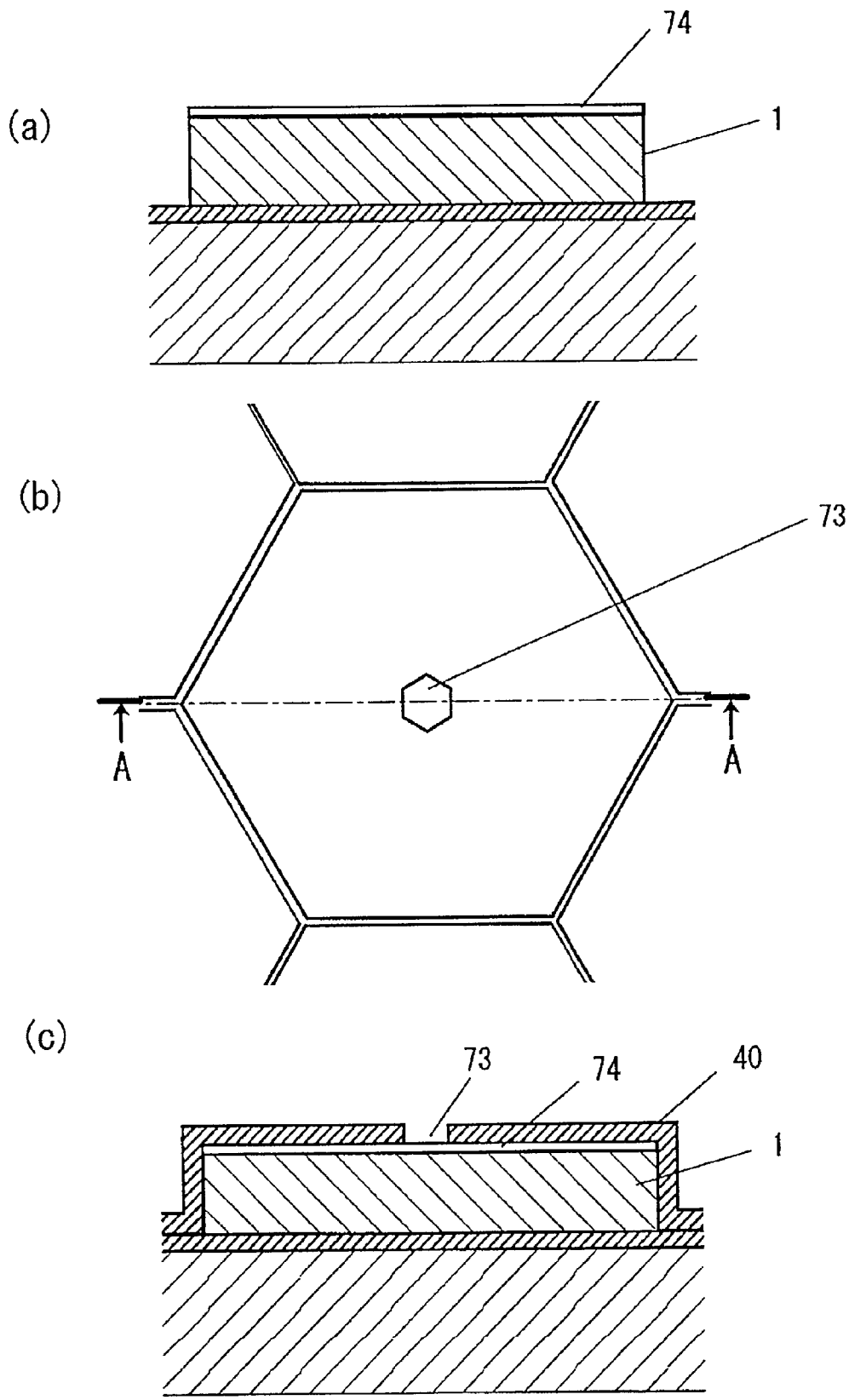
FIG. 13 Explanatory diagrams illustrating a production method for a micro-mechanical structure system according to Embodiment 2 of the present invention, from a structure forming step to a first sacrificial layer forming step.

FIG. 13 is explanatory diagrams illustrating a production method for a micro-mechanical structure system according to Embodiment 2 of the present invention, from a structure forming step to a first sacrificial layer forming step. FIG. 13(a) is a cross-sectional view after the structure forming step; FIG. 13(b) is a plan view after the first sacrificial layer forming step; and FIG. 13(c) is a cross-sectional view after the first sacrificial layer forming step, taken along dot-dash line A-A.

As shown in FIG. 13(a), after the outer shape of the mirror 1 is formed, the stress adjustment film 74 is formed with the same material, shape, and thickness as those of the light reflecting film 2 (not shown), by sputtering technique and lift-off.

As shown in FIG. 13(b) and FIG. 13(c), after the first sacrificial layer 40 is deposited, a via 73 is formed in the first sacrificial layer 40 to a depth for exposing the stress adjustment film 74.

Figure 14:
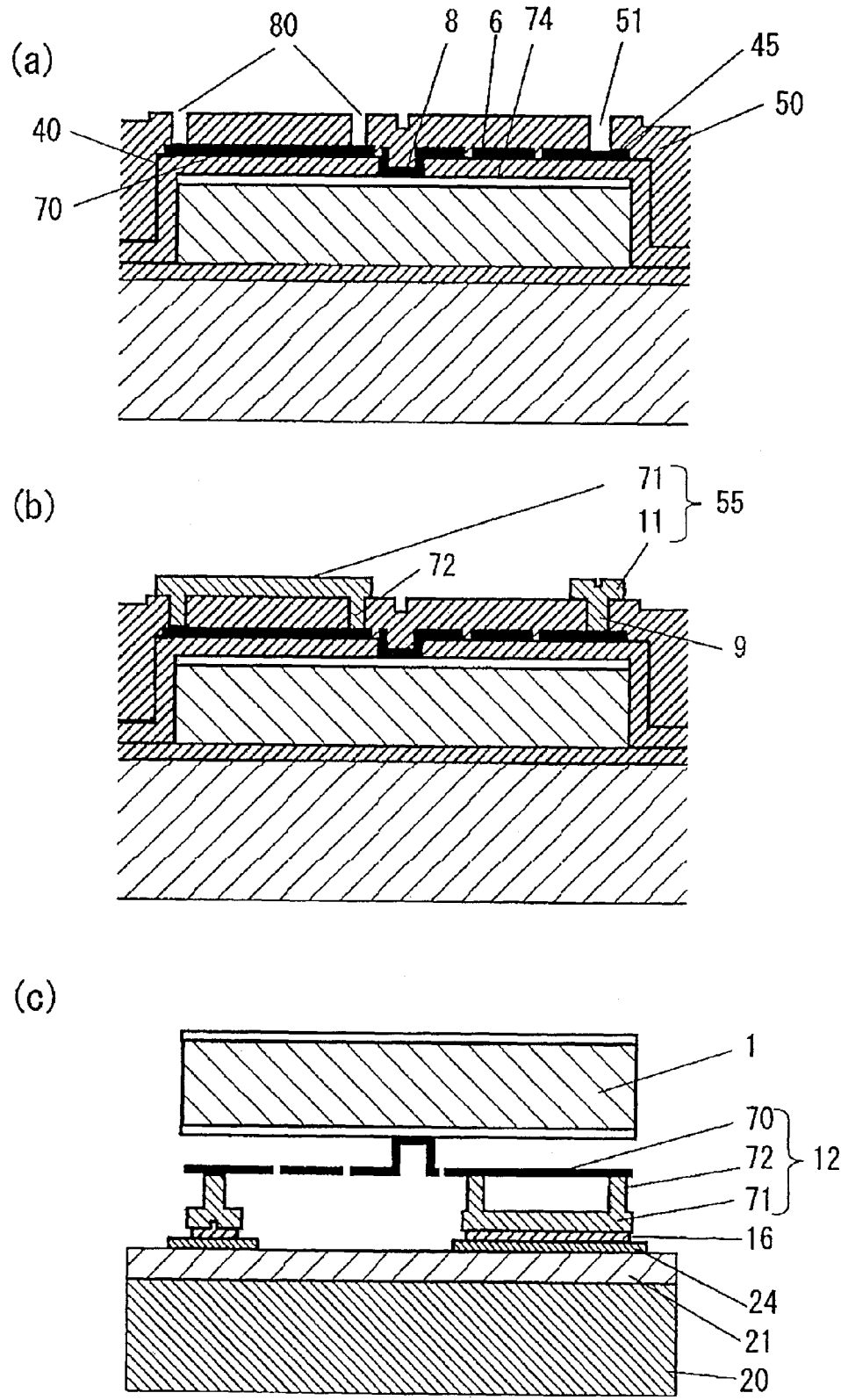
FIG. 14 Cross-sectional views illustrating a production method for a micro-mechanical structure system according to Embodiment 2 of the present invention, from a second sacrificial layer forming step to a sacrificial layer removing step.

FIG. 14 is cross-sectional views illustrating a production method for a micro-mechanical structure system according to Embodiment 2 of the present invention, from a second sacrificial layer forming step to a sacrificial layer removing step. FIG. 14(a) is a cross-sectional view after the second sacrificial layer forming step; FIG. 14(b) is a cross-sectional view after a stationary electrode forming step; and FIG. 14(c) is a cross-sectional view after the sacrificial layer removing step.

As shown in FIG. 14(a), vias 80 are formed in the second sacrificial layer 50. Moreover, the hinge layer 45 is deposited over the via (see FIG. 13), thus forming the mirror link post 8 and linking the stress adjustment film 74 to the hinge members 6. The hinge layer 45 is formed by depositing polysilicon on the first sacrificial layer 40 by LPCVD.

Herein, the relative distance between the stress adjustment film 74 and each intermediate electrode 70, which is formed by depositing the hinge layer 45, is determined by the thickness of the first sacrificial layer 40. The first sacrificial layer 40 is formed by LPCVD, and its thickness can be kept under highly precise management through controlling of the deposition time. Therefore, variations in the electrostatic forces occurring between the intermediate electrodes 70 and the stress adjustment film 74 (and the mirror 1) can be reduced to be very little. Moreover, the positional precision of the intermediate electrodes 70 along a direction which is horizontal to the substrate is determined by the alignment precision of the mask used during exposure, and has only a small error of several μm. Therefore, the misalignments between the intermediate electrodes 70 and the mirror 1 can be reduced to be very small. As a result, a micro-mechanical structure system can be provided such that: there is little deviation in the points of application of electrostatic forces; there is little change in the rotation moments; and there is little error in the pivoting operation of the mirror 1.

As shown in FIG. 14(b), the stationary electrode layer 55 is formed by depositing polysilicon on the second sacrificial layer 50 by LPCVD. As a result, the electrode bonding portions 71 and the hinge electrodes 11 are formed, and the second link portions 72 are also formed inside the vias 80 at the same time.

As shown in FIG. 14(c), the electrode bonding portions 71 are bonded to the second circuit electrodes 24 via the second adhesion members 16. The electrode bonding portions 71 are formed so as to be smaller than the second circuit electrodes 24, such that substantially the entire surface of each electrode bonding portion 71 is bonded to the second circuit electrode 24. In the case where the polysilicon composing the electrode bonding portions 71 has a stress gradient along the thickness direction, warpage may occur in the electrode bonding portions 71, but such warpage can be prevented by bonding substantially the entire surface of each electrode bonding portion 71 to the second circuit electrode 24.

Thus, according to the present embodiment, the thickness of the first sacrificial layer 40, which determines the relative distances between the intermediate electrodes 70 and the mirror 1 are highly precisely controlled by LPCVD. Therefore, there can be provided a micro-mechanical structure system having an excellent controllability, which allows little variation in the relative distances and little variation in the electrostatic forces.

Moreover, the misalignments between the intermediate electrodes 70 and the mirror 1 along any in-plane direction can be minimized so long as the accuracy of lithography allows. Therefore, variation in each center position of driving serving as a point of application of an electrostatic force can be reduced, and there is little variation in size of the rotation moments during the pivoting operation of the mirror 1. Thus, a micro-mechanical structure system which is capable of highly precisely controlling its pivoting operation can be provided.

Moreover, since the intermediate electrodes 70 are provided between the actuator electrodes 12 and the mirror 1, such that the mirror 1 and the intermediate electrodes 70 constitute electrostatic actuators, the distance between the electrodes can be reduced, and a micro-mechanical structure system which provides large electrostatic forces and which is capable of low-voltage driving can be provided.

Moreover, the stress adjustment film 74 having the same material, shape, and thickness as those of the light reflecting film 2 is provided on the face of the mirror 1 that is opposite from the light reflecting film 2, there can be provided a micro-mechanical structure system which is free of warpage of the mirror 1 due to differences in coefficients of thermal expansion.

Embodiment 3

Figure 15:
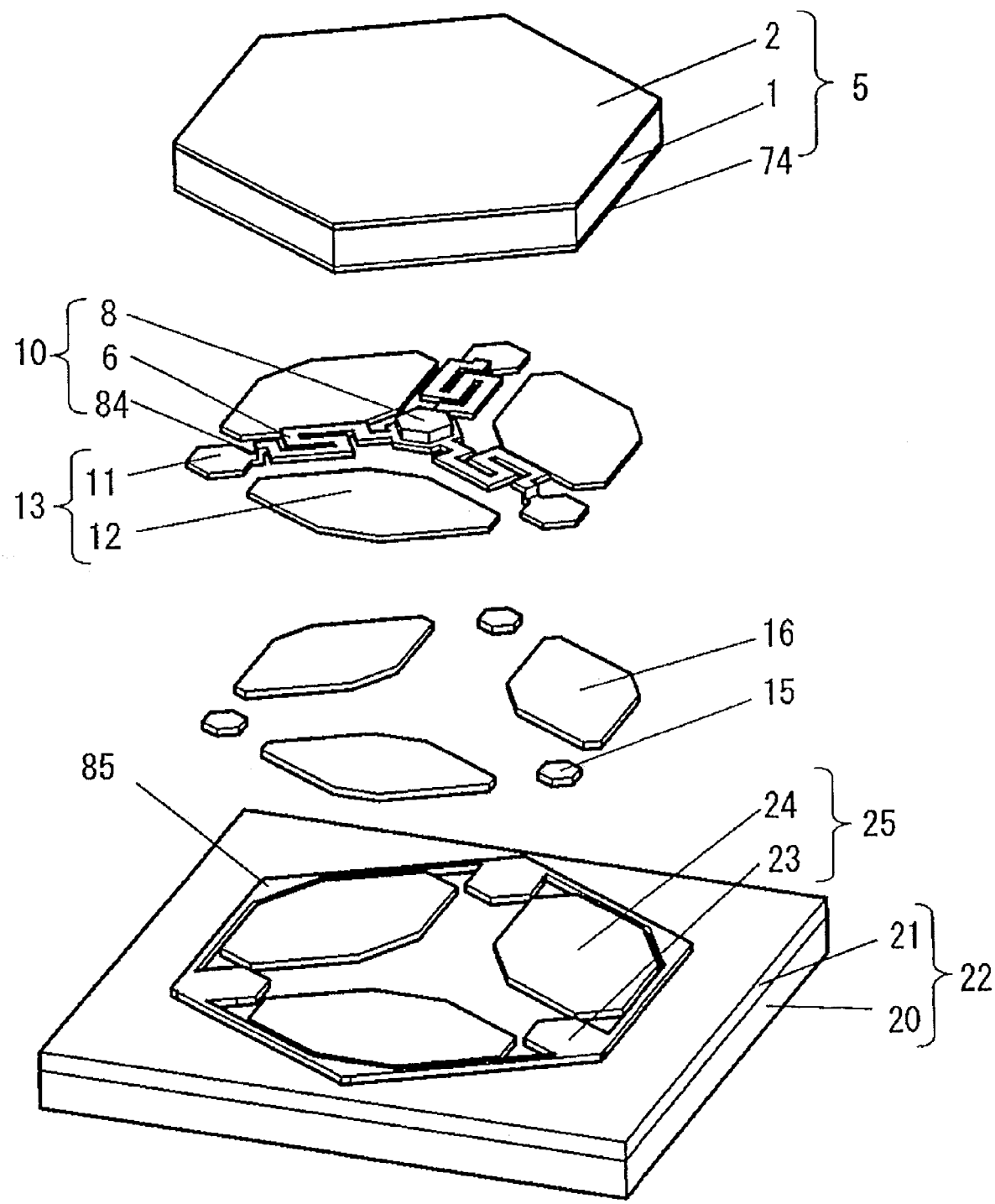
FIG. 15 An exploded perspective view of a micro-mechanical structure system according to Embodiment 3 of the present invention.

FIG. 15 is an exploded perspective view of a micro-mechanical structure system according to Embodiment 3 of the present invention. As shown in FIG. 15, component elements which are identical to those in Embodiments 1 to 2 will be denoted by the same numerals, and the descriptions thereof will be omitted.

As shown in FIG. 15, hinge posts 84 are formed at the outer peripheral ends of the hinge members 6, so as to be perpendicular to the hinge members 6. The hinge posts 84 are coupled to the end portions of the hinge electrodes 11, so as to support the hinge members 6. The hinge electrodes 11, the hinge posts 84, the hinge members 6, and the mirror link post 8 are formed integrally, as will be described later.

A stopper 85 is a plate member which is provided by expanding a portion of the electrode pattern of the second circuit electrodes 24 on the surface of the base 22. When the movable structure 5 has pivoted to a large extent, the stopper 85 comes in contact with an end portion of the movable structure 5 first, thus preventing the movable structure 5 from coming in contact with any actuator electrodes 24.

Next, with reference to FIG. 16 to FIG. 17, a production method for a micro-mechanical structure system according to Embodiment 3 of the present invention will be described. Note that, in the following cross-sectional views, dimensions along the thickness direction may not necessarily reflect the actual dimensions.

Figure 16:
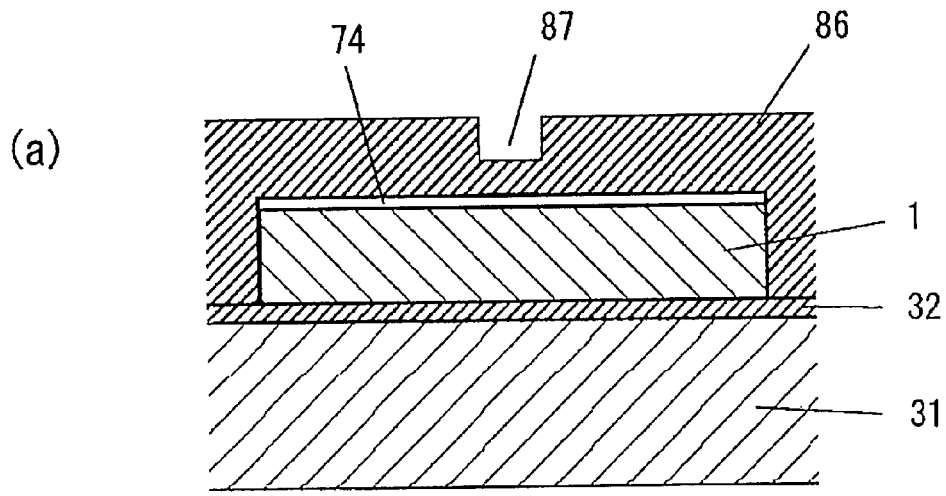
FIG. 16 Explanatory diagrams illustrating steps of a production method for a micro-mechanical structure system according to Embodiment 3 of the present invention, from a structure forming step to formation of a third sacrificial layer.
Figure 16:
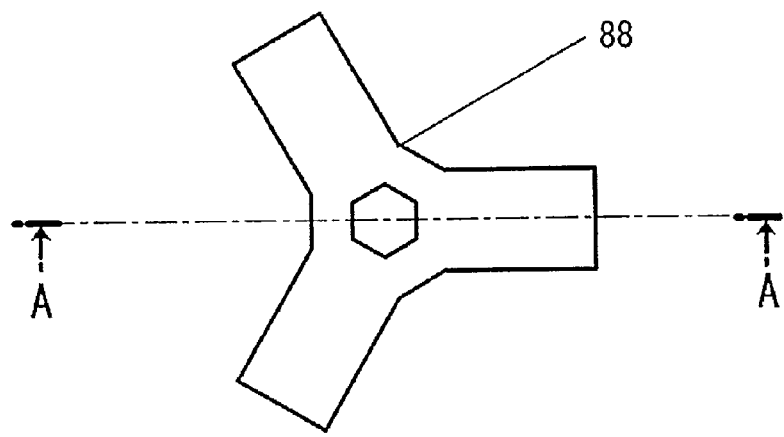
Figure 16:
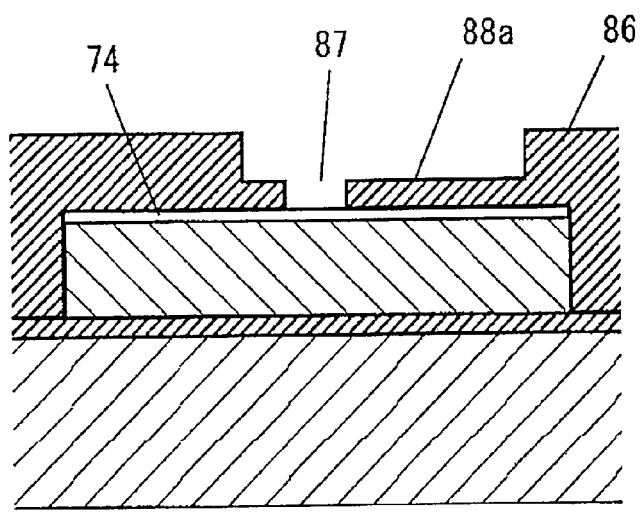

FIG. 16 is explanatory diagrams illustrating steps of a production method for a micro-mechanical structure system according to Embodiment 3 of the present invention, from a structure forming step to formation of a third sacrificial layer. FIG. 16(a) is a cross-sectional view after a first step in the formation of the third sacrificial layer; FIG. 16(b) is a plan view after a second step in the formation of the third sacrificial layer; and FIG. 16(c) is a cross-sectional view after the second step in the formation of the third sacrificial layer, taken along dot-dash line A-A.

As shown in FIG. 16(a), after the formation of the mirror 1 and formation of the stress adjustment film 74, a third sacrificial layer 86 is formed from PSG by LPCVD. The third sacrificial layer 86 has a thickness of 4 μm, for example, and its thickness variations can be minimized through controlling of the deposition time. Patterning of the third sacrificial layer 86, via etching, is performed in two steps.

A via 87 is formed in the third sacrificial layer 86 by RIE. In a first step in the etching of the third sacrificial layer, the via 86 has a depth of 2 μm, for example, and is formed to a midpoint in the thickness of the third sacrificial layer 86.

As shown in FIG. 16(b) and FIG. 16(c), a broad hinge groove 88 is formed in the third sacrificial layer 86 by RIE. In a second step in the etching of the third sacrificial layer, the hinge groove 88 is formed to a midpoint in the thickness of the third sacrificial layer 86, so as to have a depth of 2.5 μm, for example. At this time, the via 86 which is positioned in the hinge groove 88 is dug further deep, and is etched to a depth for exposing the stress adjustment film 74. An intermediate stage 88a results from formation of the hinge groove 88, and at the next step, the hinge members 6 are formed on the intermediate stage 88a.

Figure 17:
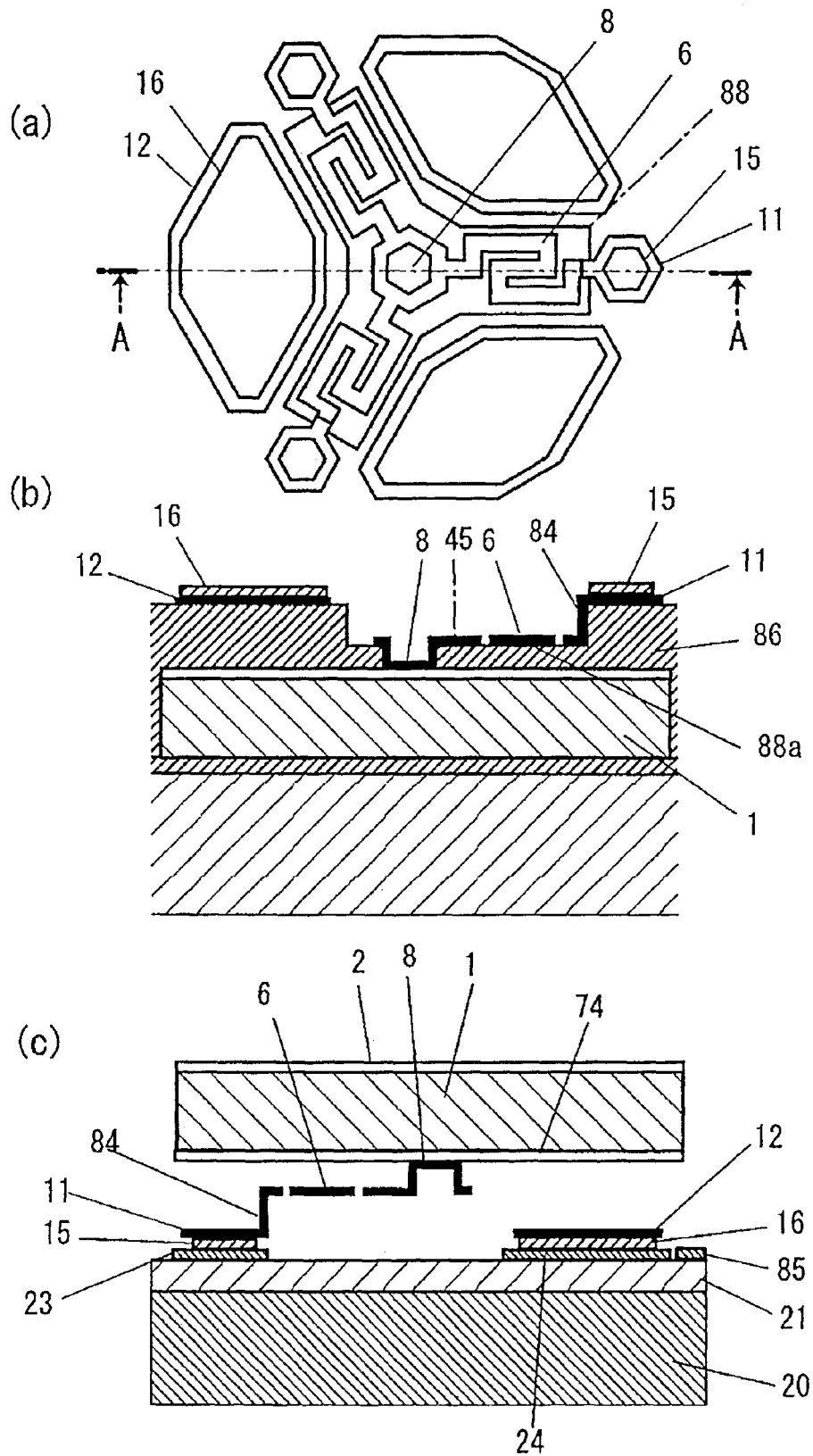
FIG. 17 Explanatory diagrams illustrating steps of a production method for a micro-mechanical structure system according to Embodiment 3 of the present invention, from an elastic supporting member forming step to after a sacrificial layer removing step.

FIG. 17 is explanatory diagrams illustrating steps of a production method for a micro-mechanical structure system according to Embodiment 3 of the present invention, from an elastic supporting member forming step to a sacrificial layer removing step. FIG. 17(a) is a plan view after the elastic supporting member forming step; FIG. 17(b) is a cross-sectional view after the elastic supporting member forming step, taken along dot-dash line A-A; and FIG. 17(c) is a cross-sectional view after the sacrificial layer removing step.

As shown in FIG. 17(a) and FIG. 17(b), the hinge layer 45 is obtained by depositing polysilicon by LPCVD, and the mirror link post 8 and the hinge members 6 are formed by etching. At the same time, the hinge posts 84 and the hinge electrodes 11 are also formed. In other words, the hinge layer 45 serves also as a stationary electrode layer 55. On the intermediate stage 88a which is formed in the third sacrificial layer 86, the hinge members 6 are formed, and the hinge posts 84 are formed along planes which are perpendicular to the intermediate stage 88a, and at the same time, the hinge electrodes 11 can be formed on the surface of the third sacrificial layer 86. As a result, it is unnecessary to form two sacrificial layers, and it is unnecessary to separately form a stationary electrode layer 55. Therefore, there can be provided a low-cost micro-mechanical structure system which allows the number of steps to be reduced.

As shown in FIG. 17(c), after the sacrificial layer is removed, the hinge support portions 6 can freely deform both at the mirror 1 side and the base 20 side, thus being able to elastically support the mirror 1.

According to the present embodiment, the intermediate stage 88a is provided in the third sacrificial layer 86, and the hinge members 6 are formed thereupon. Therefore, there can be provided a low-cost micro-mechanical structure system in which it is unnecessary to form two sacrificial layers and the hinge layer 45 can serve also as a stationary electrode layer 55.

The third sacrificial layer 86, which determines the relative distances between the mirror 1 and the actuator electrodes 12, is formed by LPCVD while keeping its thickness under highly precise management. Therefore, there can be provided a micro-mechanical structure system having an excellent controllability, which allows little variation in the relative distances and little variation in the electrostatic forces.

The misalignments between the mirror 1 and the actuator electrodes 12 along any in-plane direction can be minimized so long as the accuracy of lithography allows. Therefore, variation in each center position of driving serving as a point of application of an electrostatic force can be reduced, and there is little variation in size of the rotation moments during the pivoting operation of the mirror 1. Thus, a micro-mechanical structure system which is capable of highly precisely controlling its pivoting operation can be provided.

Since the stopper 85 is provided on the surface of the base 22, there can be provided a highly reliable micro-mechanical structure system which does not short-circuit between the second circuit electrodes 24 even when the mirror 1 has pivoted to a large extent.

Embodiment 4

Figure 18:
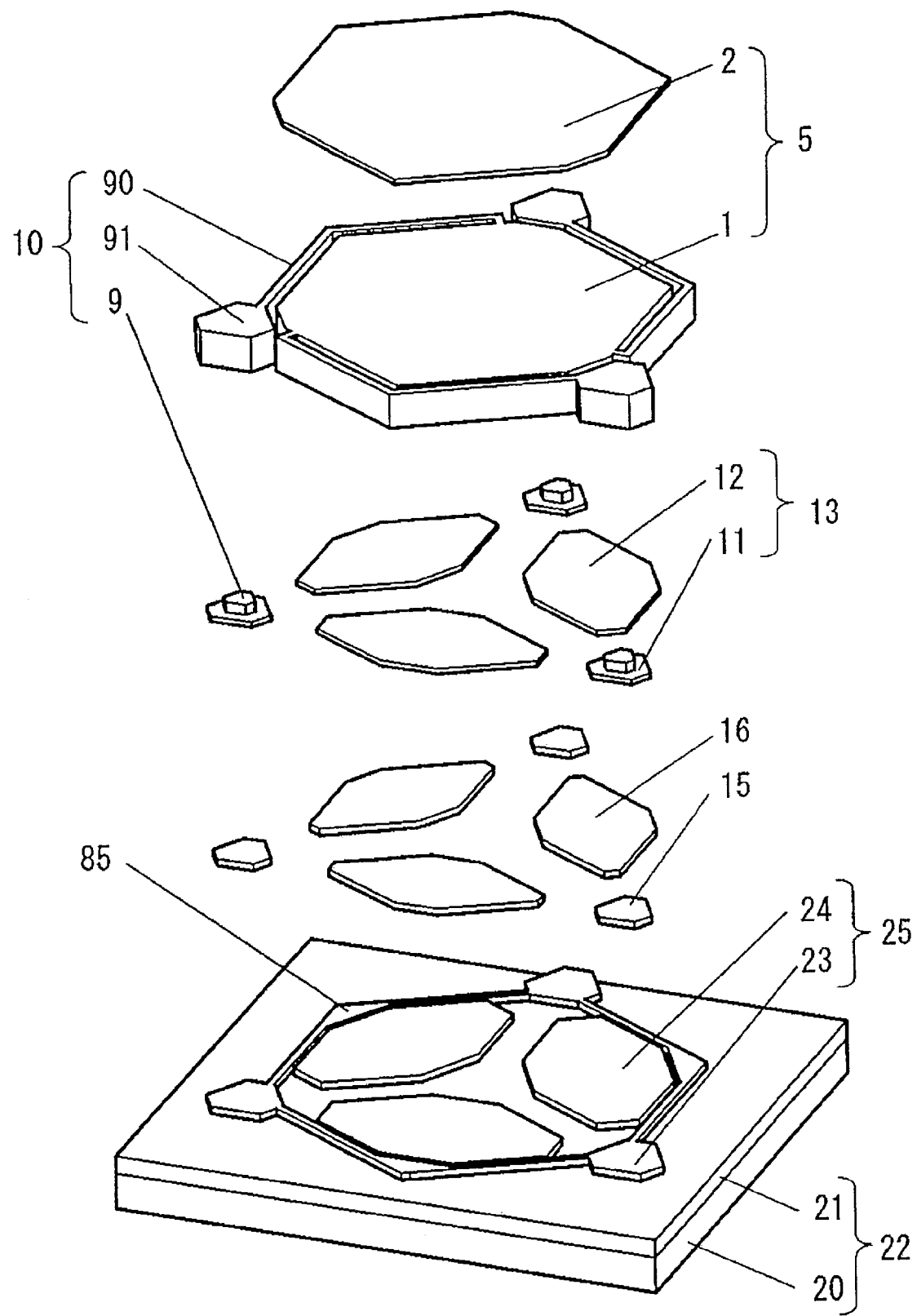
FIG. 18 An exploded perspective view of a micro-mechanical structure system according to the present embodiment.

FIG. 18 is an exploded perspective view of a micro-mechanical structure system according to the present embodiment. As shown in FIG. 18, component elements which are identical to those in Embodiments 1 to 3 will be denoted by the same numerals, and the descriptions thereof will be omitted.

As shown in FIG. 18, from the same single-crystalline silicon as the mirror 1, hinge members 90 are formed so as to be coplanar, and function as parts of an elastic supporting member. Hinge outer peripheral ends 91 are formed of the same single-crystalline silicon as the mirror 1, and are each connected to one end of a hinge member 90, and function as hinge support portions. When the mirrors 1 are placed in an array, each hinge member 90 is shared by two adjoining (not shown) mirrors 1. The hinge posts 9, the hinge members 90, and the hinge outer peripheral ends 91 constitute the elastic supporting member 10. Each first circuit electrode 23 is also shared by two adjoining (not shown) mirrors 1.

Next, with reference to FIG. 19 to FIG. 20, a production method for a micro-mechanical structure system according to the present embodiment will be described. Note that, in the following cross-sectional views, dimensions along the thickness direction may not necessarily reflect the actual dimensions.

Figure 19:
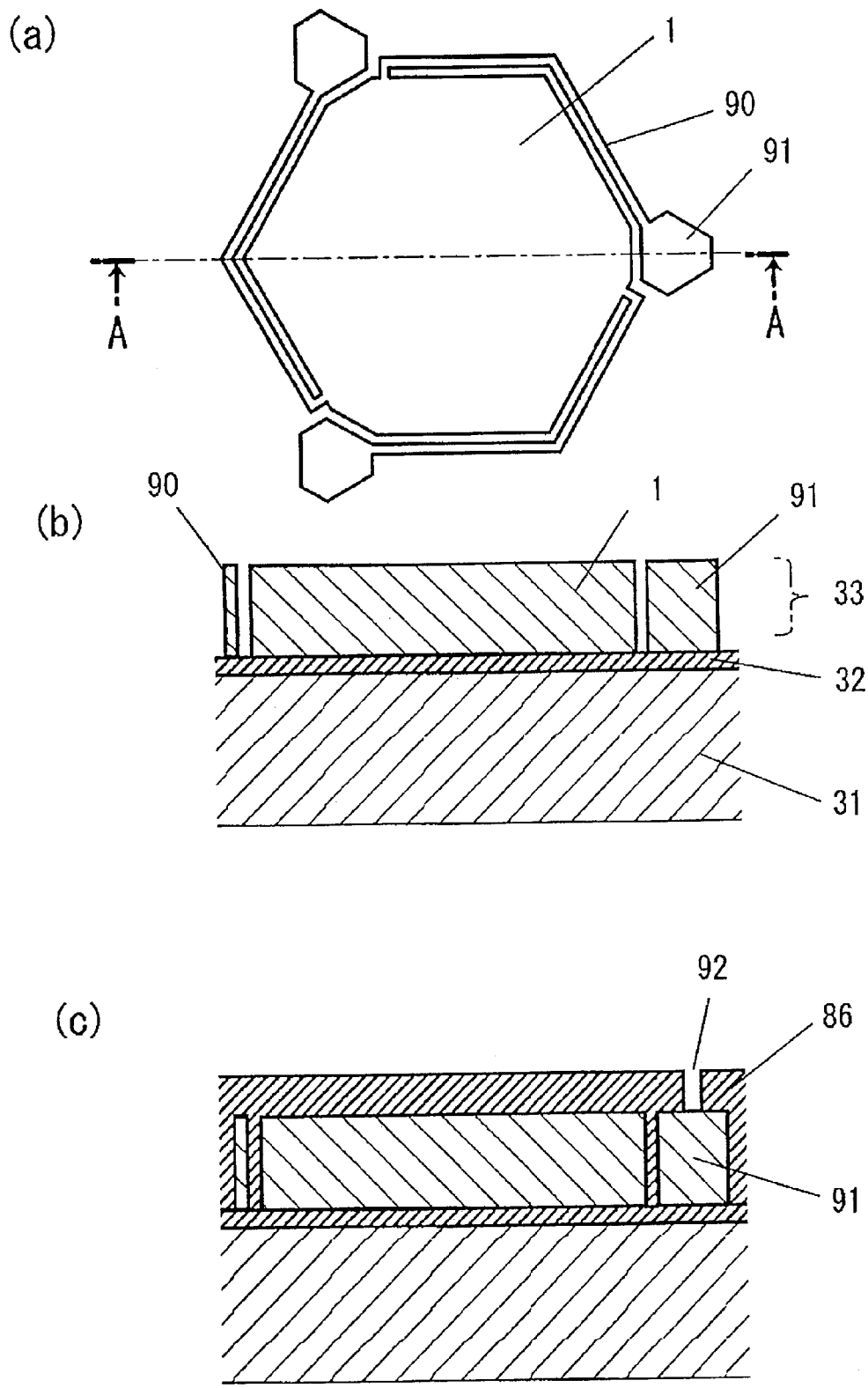
FIG. 19 Explanatory diagrams illustrating steps of a production method for a micro-mechanical structure system according to the present embodiment, from a structure forming step to formation of a third sacrificial layer.

FIG. 19 is explanatory diagrams illustrating steps of a production method for a micro-mechanical structure system according to the present embodiment, from a structure forming step to formation of a third sacrificial layer. FIG. 19(a) is a plan view after the structure forming step; FIG. 19(b) is a cross-sectional view after the structure forming step, taken along dot-dash line A-A; and FIG. 19(c) is a cross-sectional view after formation of the third sacrificial layer.

First, as shown in FIG. 19(a) and FIG. 19(b), the single-crystalline silicon layer 33 is subjected to DRIE to form trenches to a depth reaching the embedded insulating layer 32, thus forming the mirror 1, the hinge members 90, and the hinge outer peripheral ends 91.

Next, as shown in FIG. 19(c), after the third sacrificial layer 86 is formed by deposition, vias 92 are formed by RIE. The vias 92 penetrate through the third sacrificial layer 86 to expose the hinge outer peripheral ends 91.

Figure 20:
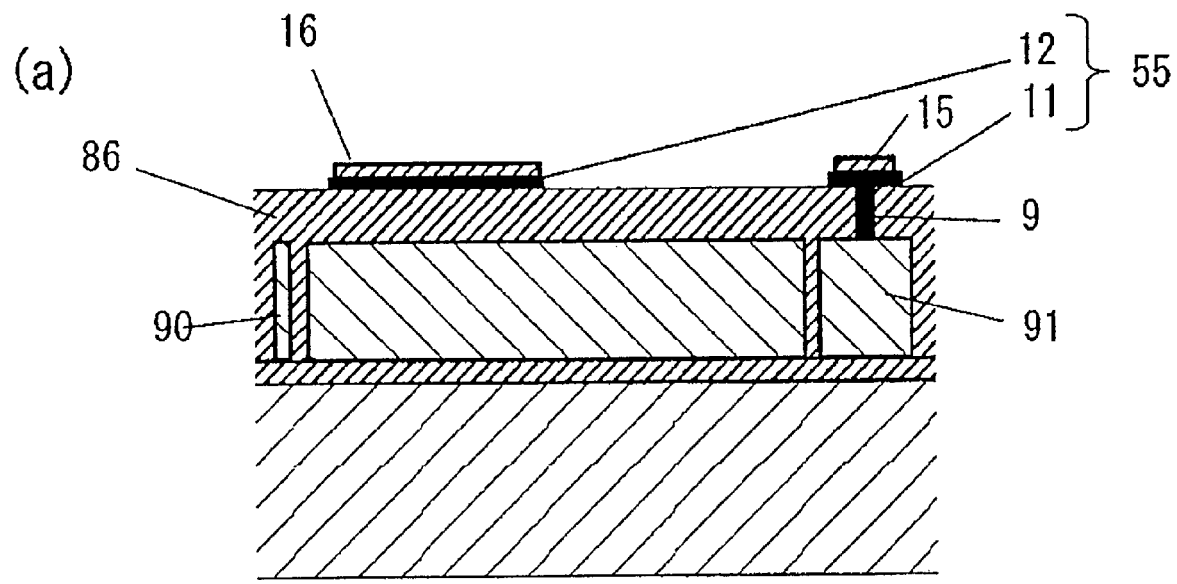
FIG. 20 Cross-sectional views illustrating steps of a production method for a micro-mechanical structure system according to the present embodiment, from a stationary electrode layer forming step to after a sacrificial layer removing step.
Figure 20:
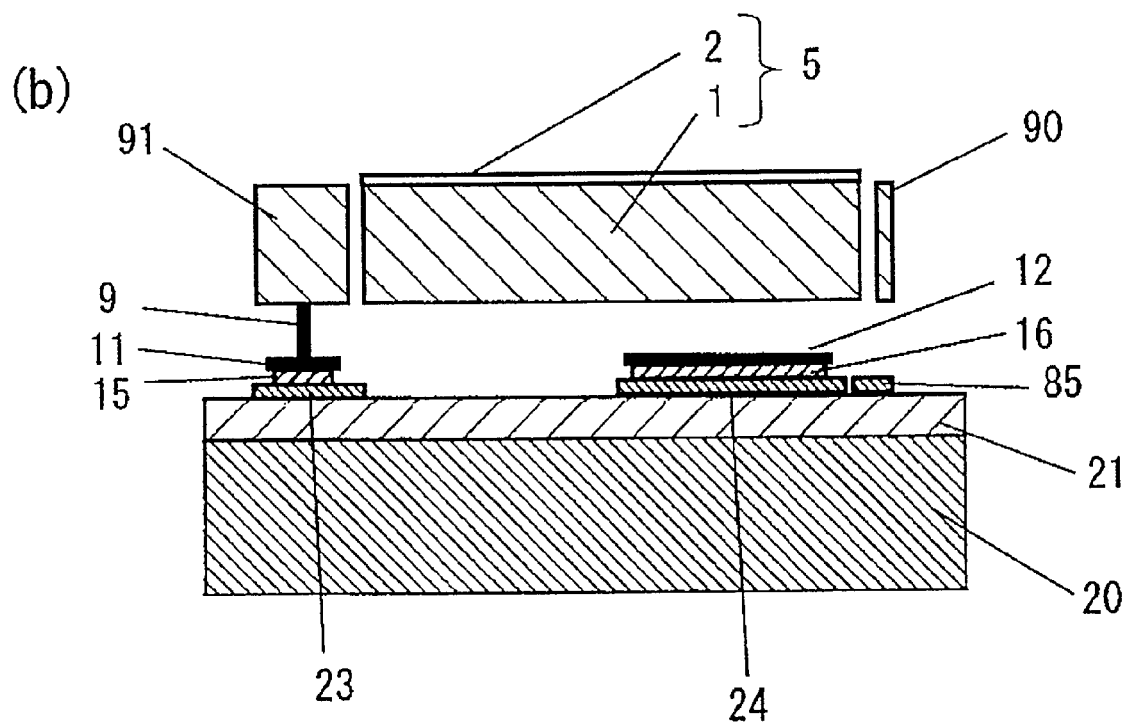

FIG. 20 is a cross-sectional view illustrating steps of a production method for a micro-mechanical structure system according to the present embodiment, from a stationary electrode layer forming step to after a sacrificial layer removing step. FIG. 20(a) is a cross-sectional view after the stationary electrode layer forming step; and FIG. 20(b) is a cross-sectional view after the third sacrificial layer removing step.

As shown in FIG. 20(a), after polysilicon is deposited by LPCVD, the hinge electrodes 11 and the actuator electrodes 12 to function as the stationary electrode 55 are formed by RIE. The first adhesion members 15 are formed on the hinge electrodes 11, and the second adhesion members 16 are formed on the actuator electrodes 12.

As shown in FIG. 20(b), after the third sacrificial layer 86 is removed, the hinge support portions 90 can freely deform, thus being able to elastically support the mirror 1.

According to the present embodiment, the mirror 1 is composed of a single-crystalline material, and bonding sites exist only between the hinge electrodes 11 and actuator electrodes 12 and the first circuit electrodes 23 and second circuit electrodes 24, so that a highly planar mirror which is excellent in terms of optical characteristics is realized. Moreover, bonding with a highly precise alignment is not required, and furthermore the movable site does not include any bonded portions. Thus, a highly reliable micro-mechanical structure system whose bonded portions are unlikely to deteriorate can be provided.

Moreover, the thickness of the third sacrificial layer 86, which determines the relative distances between the mirror 1 and the actuator electrodes 12, is highly precisely controlled by LPCVD. Therefore, there can be provided a micro-mechanical structure system having an excellent controllability, which allows little variation in the relative distances and little variation in the electrostatic forces.

The misalignments between the mirror 1 and the actuator electrodes 12 along any in-plane direction can be minimized so long as the accuracy of lithography allows. Therefore, variation in each center position of driving serving as a point of application of an electrostatic force can be reduced, and there is little variation in size of the rotation moments during the pivoting operation of the mirror 1. Thus, a micro-mechanical structure system which is capable of highly precisely controlling its pivoting operation can be provided.

Embodiment 5

Figure 21:
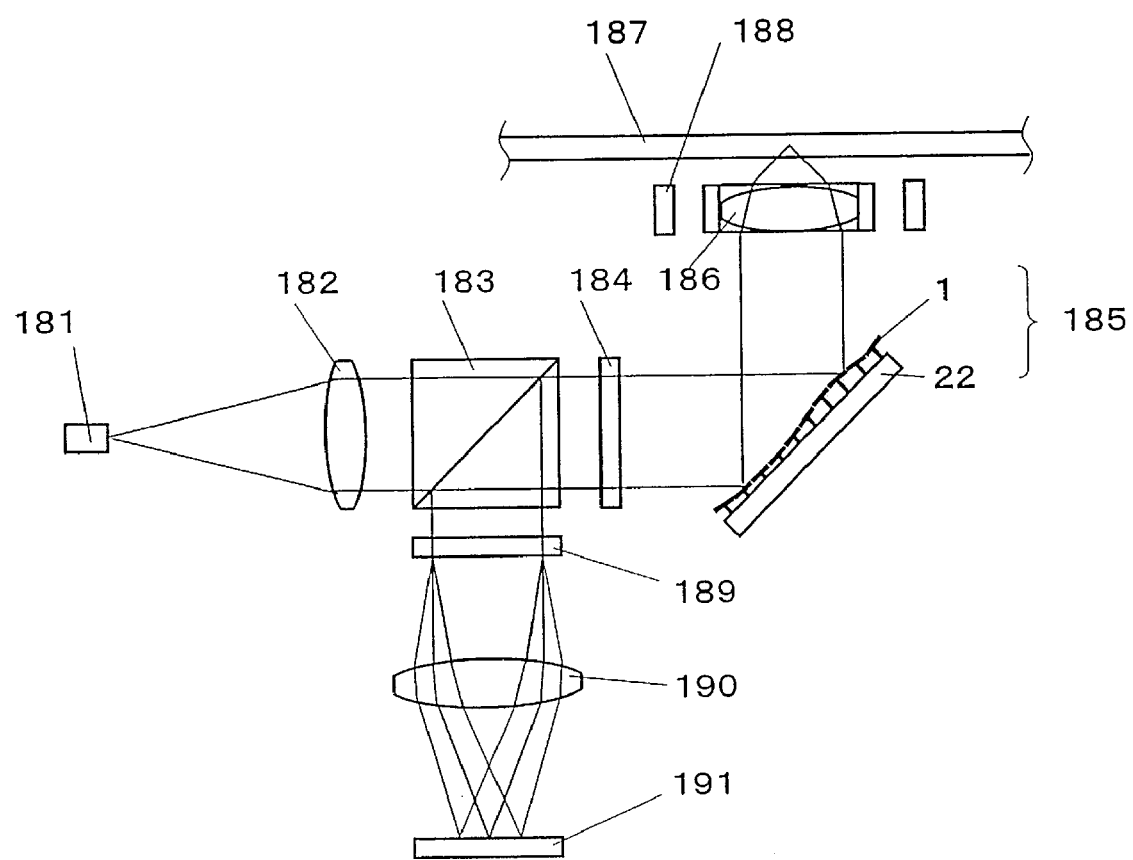
FIG. 21 A diagram showing an embodiment of an optical pickup according to the present invention.
Figure 22:
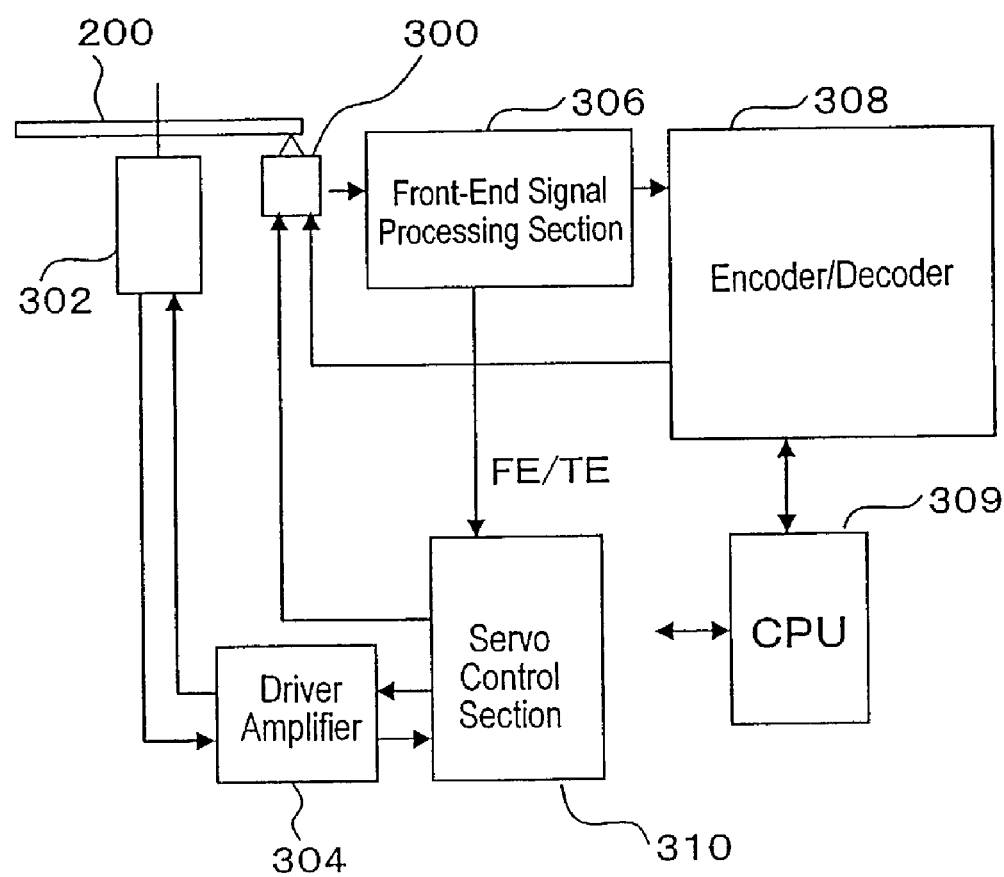
FIG. 22 A diagram showing an embodiment of an optical disk apparatus according to the present invention.

FIG. 21 shows an exemplary construction of an optical pickup having the micro-mechanical structure according to the present invention. FIG. 22 shows an exemplary construction of an optical disk apparatus having the optical pickup.

The optical pickup of FIG. 21 includes: a semiconductor laser 181 for emitting laser light; a collimating lens 182 for collimating laser light; a polarization beam splitter 183 for reflecting linearly polarized light which is polarized in a predetermined direction; a ¼ wavelength plate 184 for converting linearly polarized light into circularly polarized light; a micromirror array device 185; an objective lens 186 for converging laser light onto an optical disk 187; and an actuator 188 for changing the position of the objective lens 186.

The micromirror array device 185 is constructed so that a multitude of mirrors 1 as shown in FIG. 2 are arrayed on a base 22. A voltage is supplied by a driving circuit (not shown) to a stationary electrode that is assigned to each individual mirror 1 of the micromirror array device 185, whereby the positions and postures of the mirrors 1 are controlled.

By adjusting a reflection surface which is created by all of the mirrors 1 of the micromirror array device 185 as a whole, the wavefront phase of incident rays is controlled based on the shape of the reflection surface, whereby optical parameters such as spherical aberration can be controlled.

Although FIG. 21 illustrates a single light source 181, a plurality of light sources may be provided within one optical pickup.

Next, with reference to FIG. 22, an embodiment of an optical disk apparatus according to the present invention will be described. This embodiment includes: an optical pickup 300 having the construction shown in FIG. 21; a disk motor 302 for rotating an optical disk 200; and a portion performing various kinds of signal processing.

In the example shown in FIG. 22, an output from the optical pickup 300 is sent to an encoder/decoder 308 via a front-end signal processing section 306. During data read, the encoder/decoder 308 decodes data which is recorded on the optical disk 200, based on the signal which is obtained from the optical pickup 300. During data write, the encoder/decoder 308 encodes user data, and generates a signal to be written to the optical disk 200, which is sent to the optical pickup 300.

The front-end signal processing section 306 generates a reproduction signal based on the output from the optical pickup 300, and also generates a focus error signal FE and a tracking error signal TE. The focus error signal FE and the tracking error signal TE are sent to a servo control section 310. The servo control section 310 controls the disk motor 302 via a driver amplifier 304, and also controls the position of the objective lens via the actuator within the optical pickup 300.

Component elements such as the encoder/decoder 308 and the servo control section 310 are controlled by a CPU 309.

The optical disk apparatus according to the present invention is not limited to that which has the construction shown in FIG. 22, but may also be obtained by replacing an optical pickup in any other known optical disk apparatus with the optical pickup according to the present invention.

Embodiment 6

Figure 23:
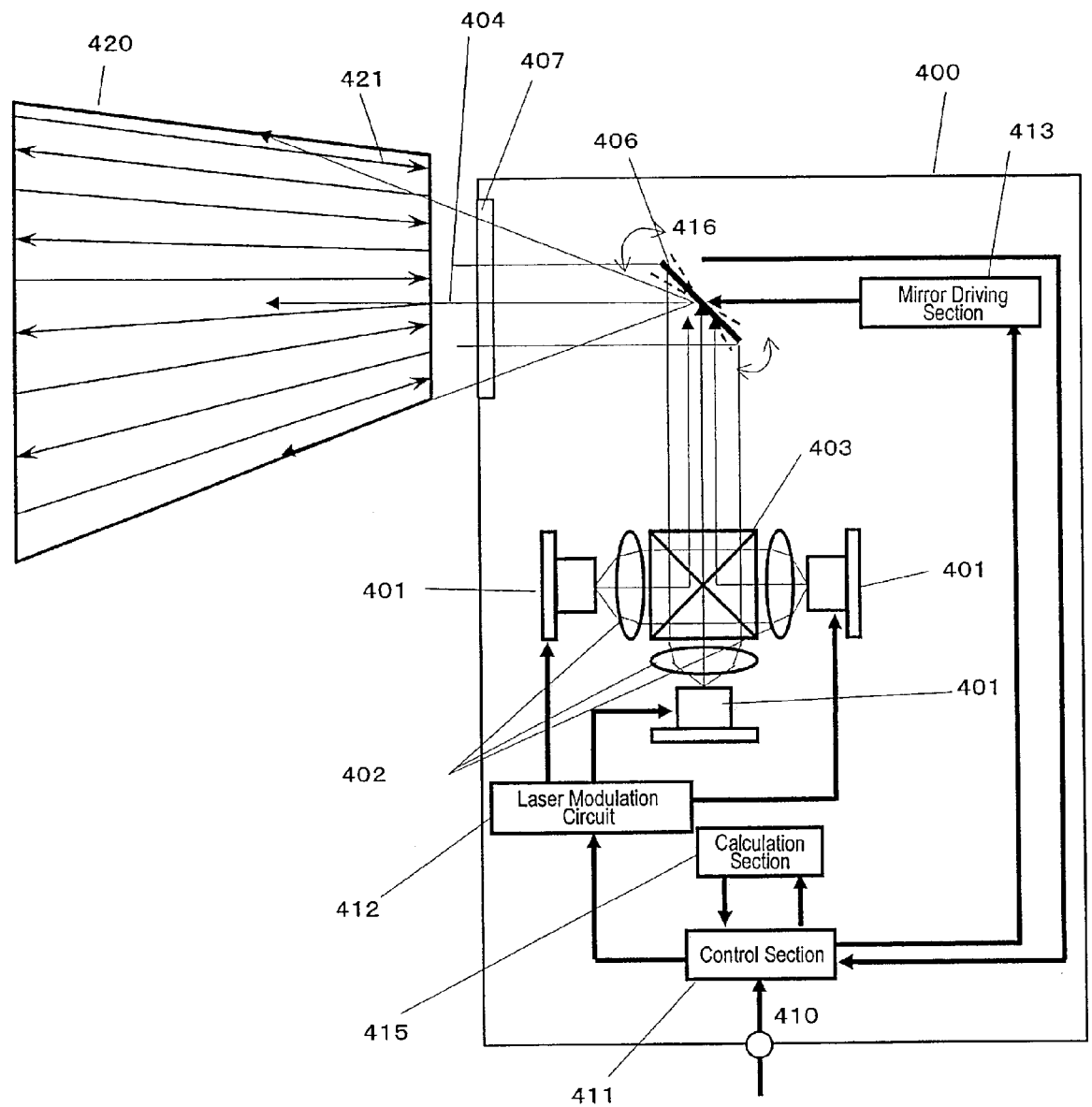
FIG. 23 A diagram showing an embodiment of a display according to the present invention.

FIG. 23 is a construction diagram showing an embodiment of a laser projector according to the present invention.

A laser projector 400 of the present embodiment includes: three laser light sources 401 for emitting light beams of three primary colors (RGB); a scan mirror section 416 for reflecting the light beams emitted from the laser light source 401 and scanning a screen 420 with the reflected beams; and so on. In the present embodiment, light beams of three colors which are emitted from the laser light source 401 are collimated by respective collimating lenses 402, and thereafter are merged by a dichroic prism 403 to form a single projection beam 404. The projection beam 404 is reflected by a scan mirror section 406 and thereafter projected toward the screen 420 via an aperture 407. The scan mirror section 406 is a micro-mechanical structure having the construction illustrated in Embodiment 1. The scan mirror section 406 includes one mirror having a high planarity, and is rapidly driven in accordance with an applied voltage. As a result, the projection beam 404 is able to scan a large-sized screen 420, and arbitrarily form an image thereon. The shape of the mirror in the scan mirror section 406 may be a hexagon inscribing in a circle having a diameter of about 100 µm, for example.

An image signal 410 which defines an image to be displayed on the screen 420 is input to a control section 411. In synchronization with a laser modulation by a laser modulation circuit 412, a mirror driving section 413 drives the scan mirror section 406. An angular displacement signal 416 which defines the angle of the scan mirror section 406 is supplied to the control section 411, whereby feedback control is performed.

The beam 404 which scans the screen 420 via the scan mirror section 406 draws a beam spot locus 421 on the screen 20.

In the display of the present embodiment, the movable section of the scan mirror section 406 pivots accurately. Thus, accurate driving by the mirror driving section 413 becomes possible.

INDUSTRIAL APPLICABILITY

A micro-mechanical structure system according to the present invention is useful as a micromirror structure for driving an optical deflector which rapidly changes the direction of light, and is particularly suitable as a micromirror device for a wave aberration correcting device which is required to have a planarity with high precision, and is applicable to various adaptive optics.

The invention claimed is:

1. A micro-mechanical structure system comprising:
   a movable structure, at least a portion of the movable structure being formed of a single-crystalline material;
   an elastic supporting member for supporting the movable structure;
   a stationary electrode section at least partially opposing the movable structure; and
   a base having a circuit section and the stationary electrode section provided thereon, the stationary electrode section being electrically connected to the circuit section, wherein,
   the stationary electrode section includes a first electrode layer positioned relative to the movable structure and a second electrode layer positioned relative to the base, the first electrode layer and the second electrode layer being bonded to each other directly or via an electrically conductive substance, and
   the first electrode layer includes a portion overhanging beyond the second electrode layer along a lateral direction.

2. The micro-mechanical structure system of claim 1, wherein a region defined by projecting the first electrode layer onto an upper face of the base is contained within a region defined by projecting the second electrode layer onto the upper face of the base.

3. The micro-mechanical structure system of claim 1, wherein,
   the first electrode layer includes a first stationary electrode and a second stationary electrode; and
   the first stationary electrode supports the elastic supporting member, and the second stationary electrode at least partially opposes the movable structure via a predetermined gap.

4. The micro-mechanical structure system of claim 1, wherein the first stationary electrode and the second stationary electrode are at least partially formed so as to be substantially coplanar.

5. The micro-mechanical structure system of claim 1, wherein the movable structure includes a light reflecting film on a face opposite from a face opposing the base.

6. The micro-mechanical structure system of claim 1, wherein the elastic supporting member is disposed between the movable structure and the base.

7. The micro-mechanical structure system of claim 6, further comprising an intermediate electrode disposed between the movable structure and the second stationary electrode via a predetermined gap, wherein,
   the intermediate electrode is linked to the movable structure, and composes a portion of the movable structure.

8. The micro-mechanical structure system of claim 6, further comprising an intermediate electrode disposed between the movable structure and the second stationary electrode via a predetermined gap, wherein,
   the intermediate electrode is linked to the second stationary electrode, and composes a portion of the second stationary electrode.

9. The micro-mechanical structure system of claim 1, wherein a misalignment of the first electrode layer with respect to the movable structure and a misalignment of the second electrode layer with respect to the base are each smaller than a misalignment between the first electrode layer and the second electrode layer.

10. A production method for a micro-mechanical structure system, comprising:
- a step (A1) of providing a first substrate having a single-crystalline silicon layer and a handle substrate, and shaping the single-crystalline silicon layer into a movable structure;
- a step (A2) of forming a first sacrificial layer on the single-crystalline silicon layer;
- a step (A3) of forming an elastic support layer on the first sacrificial layer;
- a step (A4) of forming by deposition a second sacrificial layer on the elastic support layer;
- a step (A5) of forming on the second sacrificial layer a first electrode layer to function as part of a stationary electrode layer;
- a step (B) of providing a second substrate having a circuit and a second electrode layer, the second electrode layer being electrically connected to the circuit to function as part of a stationary electrode;
- a step (C) of disposing the first substrate and the second substrate so as to oppose each other, and bonding the first electrode layer to the second electrode layer;
- a step (D) of removing the handle substrate and exposing the movable structure; and
- a step (E) of removing the first sacrificial layer and the second sacrificial layer to allow the stationary electrode to at least partially oppose the movable structure.

11. The production method for a micro-mechanical structure system of claim 10, comprising, after step (D), a step of forming a light reflecting film on a surface of the movable structure.

12. The production method for a micro-mechanical structure system of claim 11, comprising, after step (A1), a step of forming a stress adjustment film.

13. An optical pickup comprising:
- a light source for emitting a light beam;
- an objective lens for converging the light beam onto an optical disk;
- a photodetector for receiving the light beam reflected from the optical disk and generating an electrical signal; and
- an aberration correcting device for correcting an aberration of the light beam, wherein,
- the aberration correcting device includes:
- a movable structure, at least a portion of the movable structure being formed of a single-crystalline material;
- an elastic supporting member for supporting the movable structure;
- a stationary electrode section at least partially opposing the movable structure; and
- a base having a circuit section and the stationary electrode section provided thereon, the stationary electrode section being electrically connected to the circuit section, wherein,
- the stationary electrode section includes a first electrode layer positioned relative to the movable structure and a second electrode layer positioned relative to the base, the first electrode layer and the second electrode layer being bonded to each other directly or via an electrically conductive substance, and
- the first electrode layer includes a portion overhanging beyond the second electrode layer along a lateral direction.

14. An optical disk apparatus comprising:
- a motor for rotating an optical disk;
- an optical pickup for accessing a desired track on the optical disk; and
- a signal processing section for reproducing data from the optical disk based on an output from the optical pickup, wherein,
- the optical pickup includes:
- a light source for emitting a light beam;
- an objective lens for converging the light beam onto an optical disk;
- a photodetector for receiving the light beam reflected from the optical disk and generating an electrical signal; and
- an aberration correcting device for correcting an aberration of the light beam, wherein,
- the aberration correcting device includes:
- a movable structure, at least a portion of the movable structure being formed of a single-crystalline material;
- an elastic supporting member for supporting the movable structure;
- a stationary electrode section at least partially opposing the movable structure; and
- a base having a circuit section and the stationary electrode section provided thereon, the stationary electrode section being electrically connected to the circuit section, wherein,
- the stationary electrode section includes a first electrode layer positioned relative to the movable structure and a second electrode layer positioned relative to the base, the first electrode layer and the second electrode layer being bonded to each other directly or via an electrically conductive substance, and
- the first electrode layer includes a portion overhanging beyond the second electrode layer along a lateral direction.

15. A display device comprising:
- a light source for emitting a light beam;
- a light source driving section for modulating an intensity of the light beam in accordance with an image signal; and
- a scan mirror section for scanning a screen with the light beam, wherein,
- the scan mirror section includes:
- a movable structure, at least a portion of the movable structure being formed of a single-crystalline material;
- an elastic supporting member for supporting the movable structure;
- a stationary electrode section at least partially opposing the movable structure; and
- a base having a circuit section and the stationary electrode section provided thereon, the stationary electrode section being electrically connected to the circuit section, wherein,
- the stationary electrode section includes a first electrode layer positioned relative to the movable structure and a second electrode layer positioned relative to the base, the first electrode layer and the second electrode layer being bonded to each other directly or via an electrically conductive substance, and the first electrode layer includes a portion overhanging beyond the second electrode layer along a lateral direction, and wherein,
- at least a portion of the movable structure functions as a mirror for reflecting the light beam.

* * * * *